US009858949B2

(12) United States Patent
Nakadai et al.

(10) Patent No.: US 9,858,949 B2
(45) Date of Patent: Jan. 2, 2018

(54) ACOUSTIC PROCESSING APPARATUS AND ACOUSTIC PROCESSING METHOD

(71) Applicant: HONDA MOTOR CO., LTD., Tokyo (JP)

(72) Inventors: Kazuhiro Nakadai, Wako (JP); Ryosuke Kojima, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/212,465

(22) Filed: Jul. 18, 2016

(65) Prior Publication Data

US 2017/0053662 A1 Feb. 23, 2017

(30) Foreign Application Priority Data

Aug. 20, 2015 (JP) ................................ 2015-162676

(51) Int. Cl.

*G10L 15/00* (2013.01)
*G10L 15/06* (2013.01)
*G10L 15/14* (2006.01)
*G10L 21/00* (2013.01)
*G10L 25/00* (2013.01)
*G10L 25/51* (2013.01)

(Continued)

(52) U.S. Cl.

CPC .............. *G10L 25/51* (2013.01); *G10L 25/27* (2013.01); *G10L 25/78* (2013.01)

(58) Field of Classification Search

CPC ....... G10L 15/265; G10L 25/78; G10L 17/02; G10L 2025/783; G10L 21/02;

(Continued)

(56) References Cited

U.S. PATENT DOCUMENTS 8,073,690 B2 * 12/2011 Nakadai .................. G10L 15/20 704/233
8,577,678 B2 * 11/2013 Nakadai .................. G10L 15/20 704/231

(Continued)

FOREIGN PATENT DOCUMENTS

JP 2012-042465 3/2012

OTHER PUBLICATIONS

Nakadai, K., Okuno, H. G., Nakajima, H., Hasegawa, Y., & Tsujino, H. (Dec. 2008). An open source software system for robot audition HARK and its evaluation. In Humanoid Robots, 2008. Humanoids 2008. 8th IEEE-RAS International Conference on (pp. 561-566). IEEE.*

(Continued)

*Primary Examiner* — Edgar Guerra-Erazo
(74) *Attorney, Agent, or Firm* — Rankin, Hill & Clark LLP

(57) ABSTRACT

An acoustic processing apparatus includes a sound source localization unit configured to estimate a direction of a sound source from an acoustic signal of a plurality of channels, a sound source separation unit configured to perform separation into a sound-source-specific acoustic signal representing a component of the sound source from the acoustic signal of the plurality of channels, and a sound source identification unit configured to determine a type of sound source on the basis of the direction of the sound source estimated by the sound source localization unit using model data representing a relationship between the direction of the sound source and the type of sound source, for the sound-source-specific acoustic signal.

5 Claims, 12 Drawing Sheets

(51) Int. Cl.
*G10L 25/78* (2013.01)
*G10L 25/27* (2013.01)

(58) Field of Classification Search
CPC ................. G10L 15/142; G10L 17/005; G10L 2021/02161; G10L 21/00; G10L 21/0224; G10L 21/0272; G10L 21/0364; G10L 21/057; G10L 25/06; G10L 2021/02166
USPC .... 704/239, 270, 270.1, 275, 243, 233, 234, 704/231, 256, 255, 236, 240
See application file for complete search history.

(56) References Cited

U.S. PATENT DOCUMENTS

| | | | | |
|---|---|---|---|---|
| 8,693,287 | B2 * | 4/2014 | Nakadai | G01S 3/8006 367/124 |
| 2011/0224980 | A1 * | 9/2011 | Nakadai | G10L 15/20 704/233 |
| 2012/0069714 | A1 * | 3/2012 | Nakadai | G01S 3/8006 367/125 |

OTHER PUBLICATIONS

S. Argentieri, P. Danès, P. Souères, "A survey on sound source localization in robotics: From binaural to array processing methods," Comput. Speech Lang., 34 (1) (2015), pp. 87-112.*
J. Huang, T. Supaongprapa, I. Terakura, F. Wang, N. Ohnishi, N. Sugie, "A model-based sound localization system and its application to robot navigation," Robot. Auton. Syst., 27 (4) (1999), pp. 199-209.*

* cited by examiner

FIG. 8A

| SOUND UNIT | SOUND UNIT UNIGRAM |
|---|---|
| $s_1$ | $p(s_1)$ |
| $s_2$ | $p(s_2)$ |
| $s_3$ | $p(s_3)$ |
| ... | ... |

FIG. 8B

| SOUND UNIT | SOUND UNIT BIGRAM |
|---|---|
| $s_1s_1$ | $p(s_1\|s_1)$ |
| $s_2s_1$ | $p(s_1\|s_2)$ |
| $s_3s_1$ | $p(s_1\|s_3)$ |
| ... | ... |

FIG. 8C

| SOUND UNIT | SOUND UNIT TRIGRAM |
|---|---|
| $s_1s_1s_1$ | $p(s_1\|s_1s_1)$ |
| $s_1s_2s_1$ | $p(s_1\|s_1s_2)$ |
| $s_1s_3s_1$ | $p(s_1\|s_1s_3)$ |
| ... | ... |

FIG. 9A

| SOUND UNIT GROUP | SOUND UNIT GROUP UNIGRAM |
|---|---|
| $w_1$ | $p(w_1)$ |
| $w_2$ | $p(w_2)$ |
| $w_3$ | $p(w_3)$ |
| ... | ... |

FIG. 9B

| SOUND UNIT GROUP | SOUND UNIT GROUP BIGRAM |
|---|---|
| $w_1w_1$ | $p(w_1 \| w_1)$ |
| $w_2w_1$ | $p(w_1 \| w_2)$ |
| $w_3w_1$ | $p(w_1 \| w_3)$ |
| ... | ... |

FIG. 9C

| SOUND UNIT GROUP | SOUND UNIT GROUP TRIGRAM |
|---|---|
| $w_1w_1w_1$ | $p(w_1 \| w_1w_1)$ |
| $w_1w_2w_1$ | $p(w_1 \| w_2w_1)$ |
| $w_1w_3w_1$ | $p(w_1 \| w_3w_1)$ |
| ... | ... |

ACOUSTIC PROCESSING APPARATUS AND ACOUSTIC PROCESSING METHOD

CROSS-REFERENCE TO RELATED APPLICATION

Priority is claimed on Japanese Patent Application No. 2015-162676, filed Aug. 20, 2015, the content of which is incorporated herein by reference.

BACKGROUND OF THE INVENTION

Field of the Invention

The present invention relates to an acoustic processing apparatus and an acoustic processing method.

Background Art

Acquisition of information on a sound environment is an important factor in environment understanding, and an application to robots with artificial intelligence is expected. In order to acquire the information on a sound environment, fundamental technologies such as sound source localization, sound source separation, sound source identification, speech section detection, and voice recognition are used. In general, a variety of sound sources are located at different positions in the sound environment. A sound collection unit such as a microphone array is used at a sound collection point to acquire the information on a sound environment. In the sound collection unit, an acoustic signal in which acoustic signals of mixed sound from respective sound sources are superimposed is acquired.

The acoustic signal for each sound source has been conventionally acquired by performing sound source localization on the collected acoustic signal and performing the sound source separation on the acoustic signal on the basis of a direction of each sound source as a processing result of the sound source identification in order to perform sound source identification on the mixed sound.

For example, a sound source direction estimation apparatus described in Japanese Unexamined Application, First Patent Publication No. 2012-042465 includes a sound source localization unit for an acoustic signal of a plurality of channels, and a sound source separation unit that separates an acoustic signal of each sound source from the acoustic signal of a plurality of channels on the basis of a direction of each sound source estimated by the sound source localization unit. The sound source direction estimation apparatus includes a sound source identification unit that determines class information for each sound source on the basis of the separated acoustic signal for each sound source.

SUMMARY OF THE INVENTION

However, although the separated acoustic signal for each sound source is used in the sound source identification described above, information on the direction of the sound source is not explicitly used in the sound source identification. Components of other sound sources may be mixed in the acoustic signal of each sound source obtained through the sound source separation. Therefore, sufficient performance of the sound source identification is not obtained.

Aspects according to the present invention have been made in view of the above circumstances, and an object thereof is to provide an acoustic processing apparatus and an acoustic processing method capable of improving performance of the sound source identification.

To achieve the above object, the present invention adopts the following aspects.

(1) An acoustic processing apparatus according to an aspect of the present invention includes a sound source localization unit configured to estimate a direction of a sound source from an acoustic signal of a plurality of channels; a sound source separation unit configured to perform separation into a sound-source-specific acoustic signal representing a component of the sound source from the acoustic signal of the plurality of channels; and a sound source identification unit configured to determine a type of sound source on the basis of the direction of the sound source estimated by the sound source localization unit using model data representing a relationship between the direction of the sound source and the type of sound source, for the sound-source-specific acoustic signal.

(2) In the aspect (1), when a direction of the other sound source of which the type of sound source is the same as that of one sound source is within a predetermined range from a direction of the one sound source, the sound source identification unit may determine that the other sound source is the same as the one sound source.

(3) In the aspect (1), the sound source identification unit may determine a type of one sound source on the basis of an index value calculated by correcting a probability of each type of sound source, which is calculated using the model data, using a first factor indicating a degree where the one sound source is likely to be the same as the other sound source, and having a value increasing as a difference between a direction of the one sound source and a direction of the other sound source of which the type of sound source is the same as that of the one sound source decreases.

(4) In the aspect (2) or (3), the sound source identification unit may determine a type of sound source on the basis of an index value calculated through correction using a second factor that is a presence probability according to the direction of the sound source estimated by the sound source localization unit.

(5) In any one of the aspects (2) to (4), the sound source identification unit may determine that the number of sound sources for each type of sound source to be detected is at most 1 with respect to the sound source of which the direction is estimated by the sound source localization unit.

(6) An acoustic processing method according to an aspect of the present invention includes: a sound source localization step of estimating a direction of a sound source from an acoustic signal of a plurality of channels; a sound source separation step of performing separation into a sound-source-specific acoustic signal representing a component of the sound source from the acoustic signal of the plurality of channels; and a sound source identification step of determining a type of sound source on the basis of the direction of the sound source estimated in the sound source localization step using model data representing a relationship between the direction of the sound source and the type of sound source, for the sound-source-specific acoustic signal.

According to the aspect (1) or (6), for the separated sound-source-specific acoustic signal, the type of sound source is determined based on the direction of the sound source. Therefore, performance of the sound source identification is improved.

In the case of the above-described (2), another sound source of which the direction is close to one sound source is determined as the same sound source as the one sound source. Therefore, even when one original sound source is detected as a plurality of sound sources of which the directions are close to one another through the sound source localization, processes related to the respective sound sources are avoided and the type of sound source is determined as one sound source. Therefore, performance of the sound source identification is improved.

In the case of the above-described (3), for another sound source of which the direction is close to that of one sound source and the type of sound source is the same as that of the one sound source, a determination of the type of the other sound source is prompted. Therefore, even when one original sound source is detected as a plurality of sound sources of which the directions are close to one another through the sound source localization, the type of sound source is correctly determined as one sound source.

In the case of the above-described (4), the type of sound source is correctly determined in consideration of a possibility that the sound source is present for each type of sound source according to the direction of the sound source to be estimated.

In the case of the above-described (5), the type of sound source is correctly determined in consideration of the fact that types of sound sources located in different directions are different.

BRIEF DESCRIPTION OF THE DRAWINGS

FIG. 8A is a diagram illustrating an example of a sound unit unigram model.

FIG. 8B is a diagram illustrating an example of a sound unit bigram model.

FIG. 8C is a diagram illustrating an example of a sound unit trigram model.

FIG. 9A is a diagram illustrating an example of a sound unit group unigram model.

FIG. 9B is a diagram illustrating an example of a sound unit group bigram model.

FIG. 9C is a diagram illustrating an example of a sound unit group trigram model.

DETAILED DESCRIPTION OF THE INVENTION

First Embodiment

Hereinafter, a first embodiment of the present invention will be described with reference to the drawings.

Figure 1:
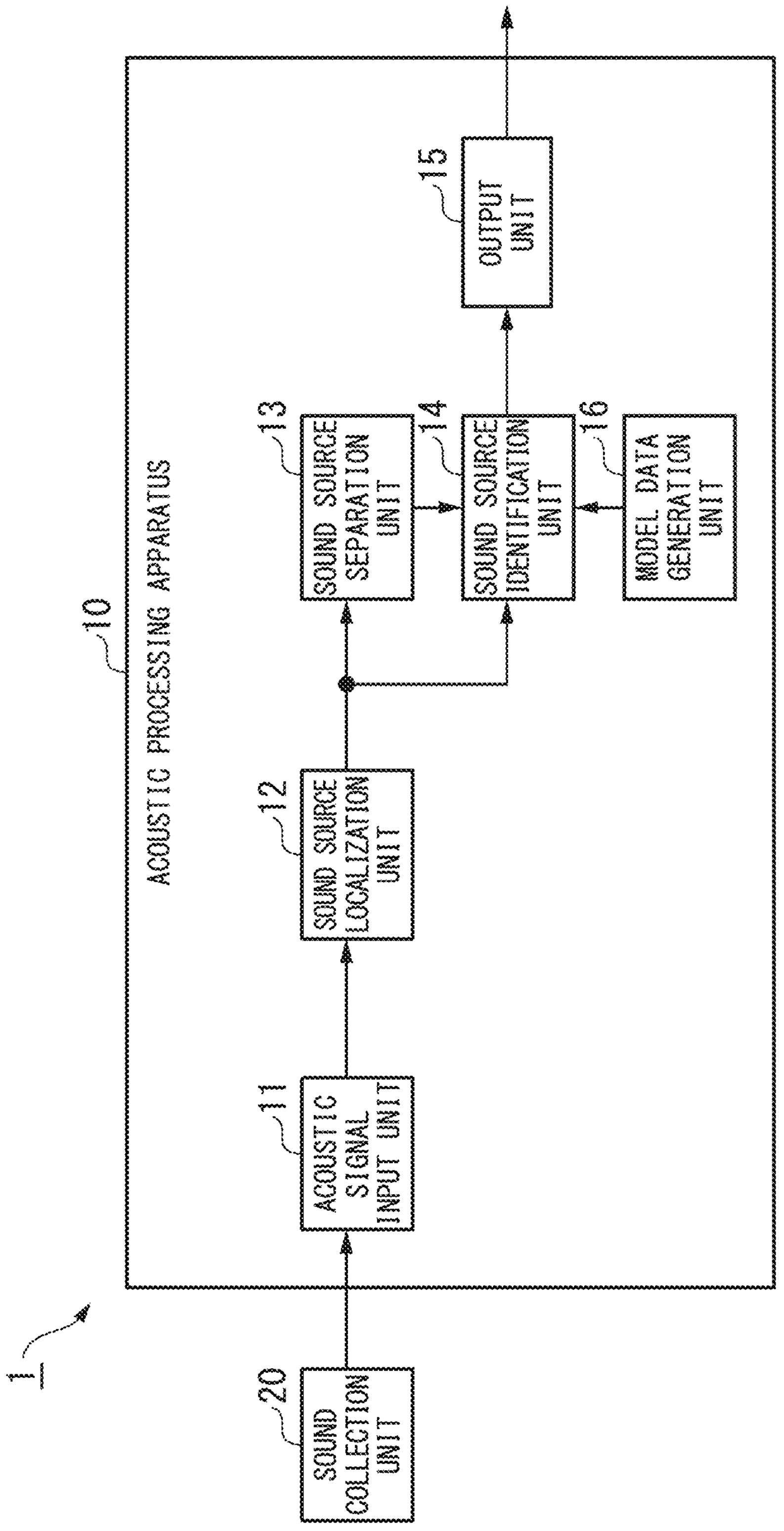
FIG. 1 is a block diagram illustrating a configuration of an acoustic processing system according to a first embodiment.

FIG. 1 is a block diagram illustrating a configuration of an acoustic processing system 1 according to this embodiment.

The acoustic processing system 1 includes an acoustic processing apparatus 10, and a sound collection unit 20.

The acoustic processing apparatus 10 estimates a direction of a sound source from an acoustic signal of P channels (P is an integer equal to or greater than 2) input from the sound collection unit 20 and separates the acoustic signal into a sound source acoustic signal representing a component of each sound source. Further, the acoustic processing apparatus 10 determines a type of sound source on the basis of the estimated direction of the sound source using model data representing a relationship between the direction of the sound source and the types of the sound source, for the sound-source-specific acoustic signal. The acoustic processing apparatus 10 outputs sound source type information indicating the determined type of sound source.

The sound collection unit 20 collects a sound arriving thereat, and generates the acoustic signal of P channels from the collected sound. The sound collection unit 20 is formed of P electro-acoustic conversion elements (microphones) arranged in different positions. The sound collection unit 20 is, for example, a microphone array in which a positional relationship among the P electro-acoustic conversion elements is fixed. The sound collection unit 20 outputs the generated acoustic signal of P channels to the acoustic processing apparatus 10. The sound collection unit 20 may include a data input and output interface for transmitting the acoustic signal of P channels wirelessly or by wire.

The acoustic processing apparatus 10 includes an acoustic signal input unit 11, a sound source localization unit 12, a sound source separation unit 13, a sound source identification unit 14, an output unit 15, and a model data generation unit 16.

The acoustic signal input unit 11 outputs the acoustic signal of P channels input from the sound collection unit 20 to the sound source localization unit 12. The acoustic signal input unit 11 includes, for example, a data input and output interface. The acoustic signal of P channels may be input from a device separate from the sound collection unit 20, such as a sound recorder, a content editing apparatus, an electronic computer, or another device including a storage medium to the acoustic signal input unit 11. In this case, the sound collection unit 20 may be omitted.

The sound source localization unit 12 determines a direction of each sound source for each frame having a predetermined length (for example, 20 ms) on the basis of the acoustic signal of P channels input from the acoustic signal input unit 11 (sound source localization). The sound source localization unit 12 calculates a spatial spectrum exhibiting power in each direction using, for example, a multiple signal classification (MUSIC) method in the sound source localization. The sound source localization unit 12 determines a sound source direction of each sound source on the basis of the spatial spectrum. The number of sound sources determined at that point in time may be one or more. In the following description, a $k_t$-th sound source direction in a frame at a time t is indicated as $d_{kt}$, and the number of sound sources to be detected is indicated as $K_t$. The sound source localization unit 12 outputs sound source direction information indicating the determined sound source direction for each sound source to the sound source separation unit 13 and the sound source identification unit 14 when performing the sound source identification (online process). The sound source direction information is information representing a direction $[d](=[d_1, d_2, \ldots, d_{kt}, \ldots, d_{Kt}]; 0 \le d_{kt} < 2\pi, 1 \le k_t \le K_t)$ of each sound source.

Further, the sound source localization unit 12 outputs the acoustic signal of P channels to the sound source separation unit 13. A specific example of the sound source localization will be described below.

The sound source direction information and the acoustic signal of the P channels are input from the sound source localization unit 12 to the sound source separation unit 13. The sound source separation unit 13 separates the acoustic signal of the P channels into sound-source-specific acoustic signals that are acoustic signals representing a component of each sound source on the basis of the sound source direction indicated by the sound source direction information. The sound source separation unit 13 uses, for example, a geometric-constrained high-order decorrelation-based source separation (GHDSS) method when separating the acoustic signal of the P channels into the sound source acoustic signals. Hereinafter, the sound-source-specific acoustic signal of the sound source $k_t$ in the frame at a time t is referred to as $S_{kt}$. The sound source separation unit 13 outputs the separated sound-source-specific acoustic signal of each sound source to the sound source identification unit 14 when performing sound source identification (online processing).

The sound source identification unit 14 receives the sound source direction information from the sound source localization unit 12, and the sound-source-specific acoustic signal for each sound source from the sound source separation unit 13. In the sound source identification unit 14, model data representing a relationship between the direction of the sound source and the type of sound source is preset. The sound source identification unit 14 determines the type of sound source for each sound source on the basis of the direction of the sound source indicated by the sound source direction information using the model data for the sound-source-specific acoustic signal. The sound source identification unit 14 generates sound source type information indicating the determined type of sound source, and outputs the generated sound source type information to the output unit 15. The sound source identification unit 14 may associate the sound-source-specific acoustic signal and the sound source direction information with the sound source type information for each sound source and output the resultant information to the output unit 15. A configuration of the sound source identification unit 14 and a configuration of the model data will be described below.

The output unit 15 outputs the sound source type information input from the sound source identification unit 14. The output unit 15 may associate the sound-source-specific acoustic signal and the sound source direction information with the sound source type information for each sound source and output the resultant information.

The output unit 15 may include an input and output interface that outputs various information to other devices, or may include a storage medium that stores such information. Further, the output unit 15 may include a display unit (for example, display) that displays the information.

The model data generation unit 16 generates (learns) model data on the basis of the sound-source-specific acoustic signal of each sound source, and the type of sound source and the sound unit of each sound source. The model data generation unit 16 may use the sound-source-specific acoustic signal input from the sound source separation unit 13, or may use a previously acquired sound-source-specific acoustic signal. The model data generation unit 16 sets the generated model data in the sound source identification unit 14. A model data generation process will be described below.

(Sound Source Localization)

Next, the MUSIC method which is one sound source localization scheme will be described.

The MUSIC method is a scheme of determining a direction ψ in which power $P_{ext}(\psi)$ of a spatial spectrum to be described below is maximized and is higher than a predetermined level as a sound source direction. A transfer function for each sound source direction ψ distributed at a predetermined interval (for example, 5°) is prestored in a storage unit included in the sound source localization unit 12. The sound source localization unit 12 generates, for each sound source direction ψ, a transfer function vector $[D(\psi)]$ having, as an element, a transfer function $D_{[p]}(\omega)$ from the sound source to a microphone corresponding to each channel p (p is an integer equal to or greater 1 and smaller than or equal to P).

The sound source localization unit 12 calculates a conversion coefficient $x_p(\omega)$ by converting an acoustic signal $x_p(t)$ of each channel p into a frequency domain for each frame having a predetermined number of samples. The sound source localization unit 12 calculates an input correlation matrix $[R_{xx}]$ shown in Equation (1) from an input vector $[x(\omega)]$ including the calculated conversion coefficient as an element.

[Equation 1]

$$[R_{xx}]=E[[x(\omega)][x(\omega)]^*] \qquad (1)$$

In Equation (1), E[ . . . ] indicates an expected value of . . . . [ . . . ] indicates that . . . is a matrix or vector. [ . . . ]* indicates a conjugate transpose of a matrix or a vector.

The sound source localization unit 12 calculates an eigenvalue $\delta_i$ and an eigenvector $[e_i]$ of the input correlation matrix $[R_{xx}]$. The input correlation matrix $[R_{xx}]$, the eigenvalue $\delta_i$, and the eigenvector $[e_i]$ have a relationship shown in Equation (2).

[Equation 2]

$$[R_{xx}][e_i]=\delta_i[e_i] \qquad (2)$$

In Equation (2), i is an integer equal to or greater than 1 and smaller than or equal to P. An order of the index i is a descending order of an eigenvalue $\delta_i$. The sound source localization unit 12 calculates the power $P_{sp}(\psi)$ of a frequency-specific space spectrum shown in Equation (3) on the basis of the transfer function vector $[D(\psi)]$ and the calculated eigenvector $[e_i]$.

[Equation 3]

$$P_{sp}(\phi)=\frac{|[D(\phi)]^*[D(\phi)]|}{\sum_{i=K+1}^{P}|[D(\phi)]^*[e_i]|} \qquad (3)$$

In Equation (3), K is the maximum number (for example, 2) of sound sources that can be detected. K is a predetermined natural number that is smaller than P.

The sound source localization unit 12 calculates a sum of the spatial spectrum $P_{sp}(\psi)$ in a frequency band in which an S/N ratio is higher than a predetermined threshold (for example, 20 dB) as power $P_{ext}(\psi)$ of the spatial spectrum in the entire band.

The sound source localization unit 12 may calculate a sound source position using other schemes in place of the MUSIC method. For example, a weighted delay and sum beam forming (WDS-BF) method can be used. The WDS- BF method is a scheme of calculating an square value of a delay and sum of the acoustic signal $x_p(t)$ in the entire band of each channel p as power $P_{ext}(\psi)$ of a space spectrum as shown in Equation (4), and searching for a sound source direction ψ in which the power $P_{ext}(\psi)$ of the spatial spectrum is maximized.

[Equation 4]

$$P_{ext}(\varphi)=[D(\varphi)]^*E[[x(t)][x(t)]^*][D(\varphi)] \quad (4)$$

In Equation (4), a transfer function represented by each element of [D(ψ)] indicates a contribution due to a delay of a phase from the sound source to a microphone corresponding to each channel p (p is an integer equal to or greater than 1 or smaller than P), and attenuation is neglected. That is, an absolute value of the transfer function of each channel is 1. [X(t)] is a vector having a signal value of an acoustic signal $x_p(t)$ of each channel p at a point of a time t as an element.

(Sound Source Separation)

Next, the GHDSS method which is one sound source separation scheme will be described.

The GHDSS method is a method of adaptively calculating a separation matrix [V(ω))] so that each of two cost functions, i.e., a separation sharpness $J_{SS}$([V(ω))]) and a geometric constraint $J_{GC}$([V(ω))]), is reduced. The separation matrix [V(ω))] is a matrix by which the audio signal [x(ω))] of P channels input from the sound source localization unit 12 is multiplied and that is used to calculate a sound-source-specific audio signal (estimated value vector) [u'(ω)] for each detected sound source of K channels. Here, $[\ \dots\ ]^T$ indicates a transpose of a matrix or a vector.

The separation sharpness $J_{SS}$([V(ω))]) and the geometric constraint $J_{GC}$([V(ω)]) are expressed as Equations (5) and (6), respectively.

[Equation 5]

$$J_{SS}([V(\omega)])=\|\varphi([u'(\omega)])[u'(\omega)]^*-\mathrm{diag}[\varphi([u'(\omega)])[u'(\omega)]^*]\|^2 \quad (5)$$

[Equation 6]

$$J_{GC}([V(\omega)])=\|\mathrm{diag}[[V(\omega)][D(\omega)]-[I]]\|^2 \quad (6)$$

In Equations (5) and (6), $\|\ \dots\ \|^2$ is a Frobenius norm of a matrix . . . . The Frobenius norm is a square sum (scalar value) of respective element values constituting the matrix. φ([u'(ω)]) is a non-linear function of the audio signal [u'(ω)], such as a hyperbolic tangent function. diag[ . . . ] indicates a sum of diagonal elements of the matrix . . . . Accordingly, the separation sharpness $J_{SS}$([V(ω)]) is an index value representing the magnitude of a non-diagonal element between channels of the spectrum of the audio signal (estimated value), that is, a degree of erroneous separation of one certain sound source as another sound source. Further, in Equation (6), [I] indicates a unit matrix. Therefore, the geometric constraint JGC([V(ω))]) is an index value representing a degree of an error between the spectrum of the audio signal (estimated value) and the spectrum of the audio signal (sound source).

(Model Data)

The model data includes sound unit data, first factor data, and second factor data.

Figure 2:
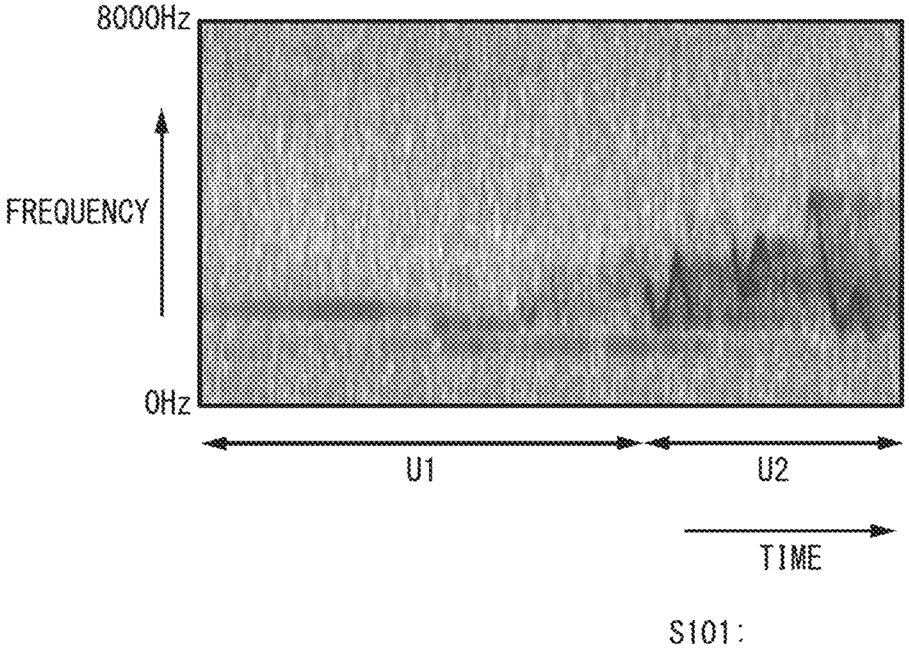
FIG. 2 is a diagram illustrating an example of a spectrogram of the sound of a bush warbler singing.

The sound unit data is data indicating a statistical nature of each sound unit constituting the sound for each type of sound source. The sound unit is a constituent unit of sound emitted by the sound source. The sound unit is equivalent to a phoneme of voice uttered by human. That is, the sound emitted by the sound source includes one or a plurality of sound units. FIG. 2 illustrates a spectrogram of the sound of a bush warbler singing "hohokekyo" for one second. In the example illustrated in FIG. 2, sections U1 and U2 are portions of the sound unit equivalent to "hoho" and "kekyo," respectively. Here, a vertical axis and a horizontal axis indicate frequency and time, respectively. The magnitude of power at each frequency is represented by shade. Darker portions indicate higher power and lighter portions indicate lower power. In the section U1, a frequency spectrum has a moderate peak, and a temporal change of the peak frequency is moderate. On the other hand, in the section U2, the frequency spectrum has a sharp peak, and a temporal change of the peak frequency is more remarkable. Thus, the characteristics of the frequency spectrum are clearly different between the sound units.

The sound unit may represent a statistical nature using, for example, a multivariate Gaussian distribution as a predetermined statistical distribution. For example, when an acoustic feature amount [x] is given, the probability p([x], $s_{cj}$, c) that the sound unit is the j-th sound unit $s_{cj}$ of the type c of sound source is expressed by Equation (7).

[Equation 7]

$$p([x],s_{cj},c)=N_{cj}([x])p(s_{cj}|C=c)p(C=c) \quad (7)$$

In Equation (7), $N_{cj}$([x]) indicates that the probability distribution p([x]|$s_{cj}$) of the acoustic feature amount [x] according to the sound unit $s_{cj}$ is a multivariate Gaussian distribution. p($s_{cj}$|C=c) indicates a conditional probability taking the sound unit $s_{cj}$ when the type C of sound source is c. Accordingly, a sum $\Sigma_j$p($s_{cj}$|C=c) of the conditional probabilities taking the sound unit $s_{cj}$ when the type C of sound source is c is 1. p(C=c) indicates the probability that the type C of sound source is c. In the above-described example, the sound unit data includes the probability p(C=c) of each type of sound source, the conditional probability p($s_{cj}$|C=c) of each sound unit $s_{cj}$ when the type C of sound source is c, a mean of the multivariate Gaussian distribution according to the sound unit $s_{cj}$, and a covariance matrix. The sound unit data is used to determine the sound unit $s_{cj}$ or the type c of sound source including the sound unit $s_{cj}$ when the acoustic feature amount [x] is given.

The first factor data is data that is used to calculate a first factor. The first factor is a parameter indicating a degree where one sound source is likely to be the same as the other sound source, and has a value increasing as a difference between a direction of the one sound source and a direction of the other sound source decreases. The first factor $q_1(C_{-kt}=c|C_{kt}=c;[d])$ is, for example, is given as Equation (8).

[Equation 8]

$$q_1(C_{-k_t}=c\,|\,C_{k_t}=c;[d])=\prod_{k_t'\neq k_t}\left(1-q\left(C_{k_t'}=c\,|\,C_{k_t}=c;[d]\right)\right) \quad (8)$$

On the left side of Equation (8), $C_{-kt}$ indicates a type of a sound source different from the one sound source $k_t$ detected at a time t at that point in time, whereas $C_{kt}$ indicates a type of the one sound source $k_t$ detected at the time t. That is, the first factor $q_1(C_{-kt}=c|C_{kt}=c;[d])$ is calculated by assuming that the number of sound sources for each type of sound source to be detected at a time is at most 1 when a type of $k_t$-th sound source $k_t$ detected at the time t is the same type c as a type of a sound source other than the $k_t$-th sound source. In other words, the first factor $q_1(C_{-k_t}=c|C_{k_t}=c;[d])$ is an index value indicating a degree where the two or more sound sources are likely to be the same sound source when the types of sound sources are the same for two or more sound source directions.

On the right side of Equation (8), $q(C_{k_t'}=c|C_{k_t}=c;[d])$ is, for example, given as Equation (9).

[Equation 9]

$$q=\left(C_{k_t'}=c \mid C_{k_t}=c;[d]\right)=p\left(C_{k_t'}=c\right)^{D\left(d_{k_t'},d_{k_t}\right)} \tag{9}$$

In Equation (9), the left side shows that $a(C_{k_t'}=c|C_{k_t}=c;[d])$ is given when a type $C_{k_t'}$ of sound source $k_t'$ and a type $C_{k_t}$ of sound source $k_t$ are both c. The right side shows the $D(d_{k_t'},d_{k_t})$ power of a probability $p(C_{k_t'}=c)$ that the type $C_{k_t'}$ of sound source $k_t'$ is c. $D(d_{k_t'},d_{k_t})$ is, for example, $|d_{k_t'}-d_{k_t}|/\pi$. Since the probability $p(C_{k_t'}=c)$ is a real number between 0 and 1, the right side of Equation (9) increases as a difference between a direction $d_{k_t'}$ of the sound source $k_t'$ and a direction $d_{k_t'}$ of the sound source kt' decreases. Therefore, the first factor $q_1(C_{-k_t}=c|C_{k_t}=c;[d])$ given in Equation (8) increases as a difference between a direction $d_{k_t}$ of the sound source $k_t$ and a direction $d_{k_t'}$ of the other sound source $k_t'$ of which the type of sound source is the same as that of the sound source $k_t$ decreases, and the first factor $q_1(C_{-k_t}=c|C_{k_t}=c;[d])$ decreases as the difference increases. In the above-described example, the first factor data includes the probability $p(C_{k_t'}=c)$ that the type $C_{k_t'}$ of sound source $k_t'$ is c, and a function $D(d_{k_t'},d_{k_t})$. However, the probability $p(C=c)$ for each type of sound source included in the sound unit data can be used in place of the probability $p(C_{k_t'}=c)$. Therefore, the probability $p(C_{k_t'}=c)$ can be omitted in the first factor data.

The second factor data is data that is used when the second factor is calculated. The second factor is a probability that the sound source is present in the direction of the sound source indicated by the sound source direction information for each type of sound source in a case in which the sound source stops or is located within a predetermined range. That is, the second model data includes a direction distribution (a histogram) of each type of sound source. The second factor data may not be set for a moving sound source.

(Generation of Model Data)

Next, a model data generation process according to this embodiment will be described.

Figure 3:
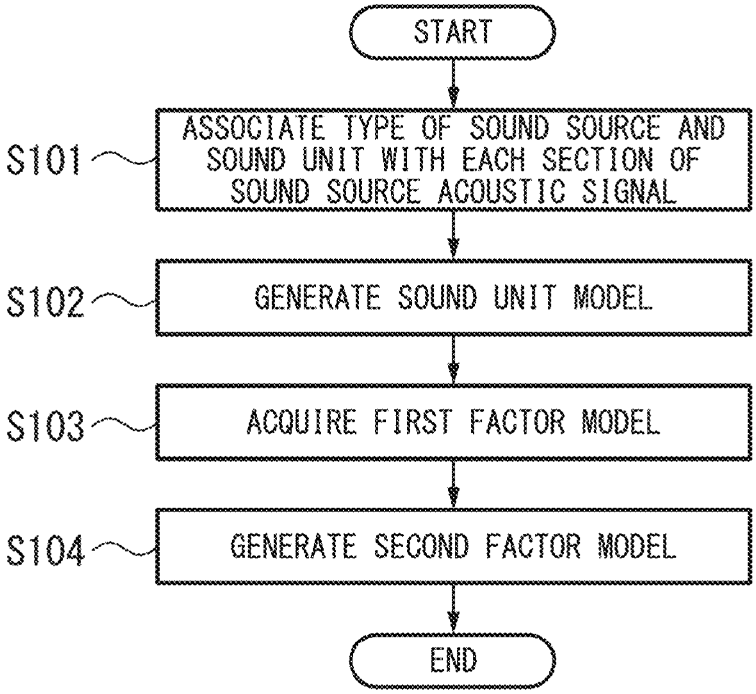
FIG. 3 is a flowchart illustrating a model data generation process according to the first embodiment.

FIG. 3 is a flowchart illustrating the model data generation process according to this embodiment.

(Step S101) The model data generation unit 16 associates the type of sound source and the sound unit with each section of the previously acquired sound source acoustic signal (annotation). The model data generation unit 16 displays, for example, a spectrogram of the sound source acoustic signal on a display. The model data generation unit 16 associates the section, the type of sound source, and the sound unit on the basis of an operation input signal representing the type of sound source, the sound unit, and the section from the input device (see FIG. 2). Thereafter, the process proceeds to step S102.

(Step S102) The model data generation unit 16 generates sound unit data on the basis of the sound-source-specific acoustic signal in which the type of sound source and the sound unit are associated with each section. More specifically, the model data generation unit 16 calculates a proportion of the section of each type of sound source as a probability $p(C=c)$ of each type of sound source. Further, the model data generation unit 16 calculates a proportion of the section of each sound unit for each type of sound source as a conditional probability $p(s_{cj}|C=c)$ of each sound unit $s_{cj}$. The model data generation unit 16 calculates a mean and a covariance matrix of the acoustic feature amount [x] for each sound unit $s_{cj}$. Thereafter, the process proceeds to step S103.

(Step S103) The model data generation unit 16 acquires data indicating the function $D(d_{k_t'},d_{k_t})$ and parameters thereof as a first factor model. For example, the model data generation unit 16 acquires the operation input signal representing the parameters from the input device. Thereafter, the process proceeds to step S104.

(Step S104) The model data generation unit 16 generates, as a second factor model, data indicating a frequency (direction distribution) of the direction of the sound source in each section of the sound-source-specific acoustic signal for each type of sound source. The model data generation unit 16 may normalize the direction distribution so that a cumulative frequency between the directions has a predetermined value (for example, 1) regardless of the type of sound source. Thereafter, the process illustrated in FIG. 3 ends. The model data generation unit 16 sets the sound unit data, the first factor model, and the second factor model that have been acquired, in the sound source identification unit 14. An execution order of steps S102, S103, and S104 is not limited to the above-described order and may be any order.

(Configuration of Sound Source Identification Unit)

Next, a configuration of the sound source identification unit 14 according to this embodiment will be described.

Figure 4:
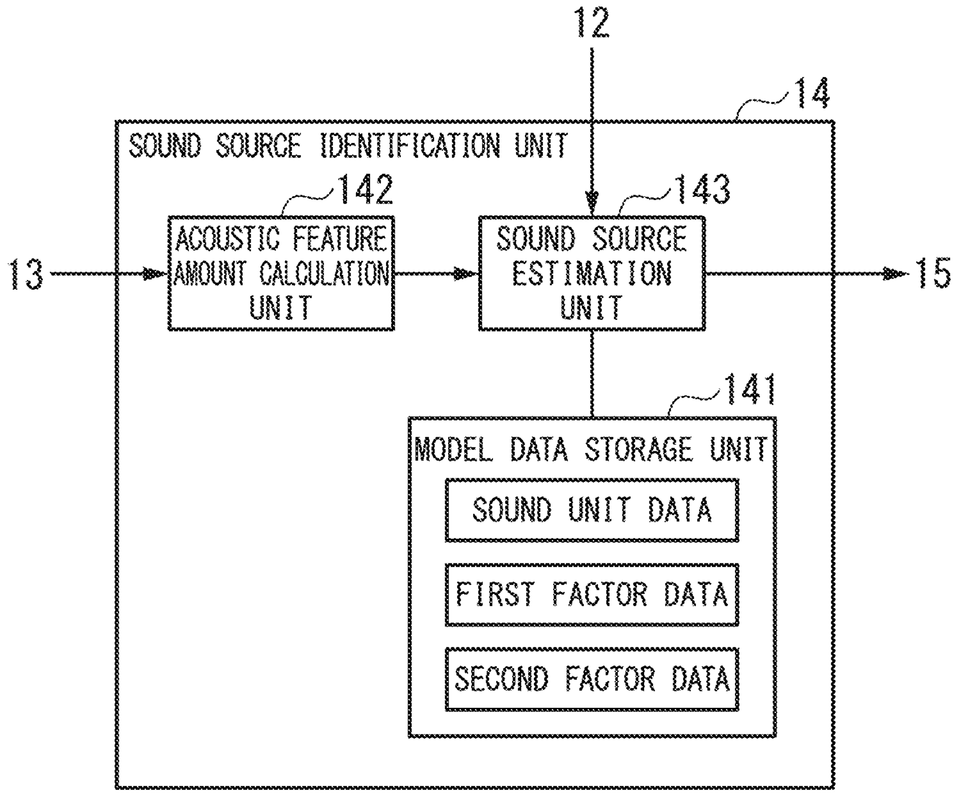
FIG. 4 is a block diagram illustrating a configuration of a sound source identification unit according to the first embodiment.

FIG. 4 is a block diagram illustrating a configuration of the sound source identification unit 14 according to this embodiment.

The sound source identification unit 14 includes a model data storage unit 141, an acoustic feature amount calculation unit 142, and a sound source estimation unit 143. The model data storage unit 141 stores model data in advance.

The acoustic feature amount calculation unit 142 calculates an acoustic feature amount indicating a physical feature for each frame of a sound-source-specific acoustic signal of each sound source input from the sound source separation unit 13. The acoustic feature amount is, for example, a frequency spectrum. The acoustic feature amount calculation unit 142 may calculate, as an acoustic feature amount, a principal component obtained by performing principal component analysis (PCA) on the frequency spectrum. In principal component analysis, a component contributing to a difference in the type of sound source is calculated as the main component. Therefore, a dimension is lower than that of the frequency spectrum. As the acoustic feature amount, a Mel scale log spectrum (MSLS), Mel frequency cepstrum coefficients (MFCC), or the like can also be used.

The acoustic feature amount calculation unit 142 outputs the calculated acoustic feature amount to the sound source estimation unit 143.

The sound source estimation unit 143 calculates a probability $p([x], s_{cj}, c)$ that is a sound unit $s_{cj}$ of the type c of sound source by referring to the sound unit data stored in the model data storage unit 141, for the acoustic feature amount input from the acoustic feature amount calculation unit 142. The sound source estimation unit 143 uses, for example, Equation (7) to calculate the probability $p([x], s_{cj}, c)$. The sound source estimation unit 143 calculates a probability $p(C_{k_t}=c|[x])$ of each type c of sound source by summing the calculated probability p([x], $s_{cj}$, c) between the sound units $s_{cj}$ in each sound source $k_t$ at each time t.

The sound source estimation unit 143 calculates a first factor ($C_{-kt}$=c|$C_{kt}$=c;[d]) by referring to the first factor data stored in the model data storage unit 141 for each sound source indicated by the sound source direction information input from the sound source localization unit 12. When calculating the first factor ($C_{-kt}$=c|$C_{kt}$=c;[d]), the sound source estimation unit 143 uses, for example, Equations (8) and (9). Here, the number of sound sources for each type of sound source to be detected at a time may be assumed to be at most one for each sound source indicated by the sound source direction information. As described above, the first factor ($C_{-kt}$=c|$C_{kt}$=c;[d]) has a great value when one sound source is the same as another sound source and a difference between a direction of the one sound source and a direction of the other sound source is smaller. That is, the first factor $q_1$ ($C_{-kt}$=c|$C_{kt}$=c;[d]) indicates that, in a case in which types of sound sources are the same for two or more sound source directions, a degree where the two or more sound sources are likely to be the same is high as the sound source directions are close to each other. The calculated value has a positive value significantly greater than 0.

The sound source estimation unit 143 calculates a second factor $q_2$($C_{kt}$=c;[d]) by referring to the second factor data stored in the model data storage unit 141 for each sound source direction indicated by the sound source direction information input from the sound source localization unit 12. The second factor $q_2$($C_{kt}$=c;[d]) is an index value indicating a frequency for each direction $D_{kt}$.

The sound source estimation unit 143 calculates, for each sound source, a correction probability p'($C_{kt}$=c[x]) that is an index value indicating a degree where the type of sound source is c by adjusting the calculated probability p($C_{kt}$=[x]) using the first factor $q_1$($C_{-kt}$=c|$C_{kt}$=c;[d]) and the second factor $q_2$($C_{kt}$=c;[d]). The sound source estimation unit 143 uses, for example, Equation (10) to calculate the correction probability p'($C_{kt}$=c[x]).

[Equation 10]

$$p'(C_{k_t}=c|[x_{k_t}])=p(C_{k_t}=c|[x_{k_t}])\cdot q_1(C_{-k_t}=c|C_{k_t}=c;[d])^{\kappa 1}\cdot q_2(C_{k_t}=c;[d])^{\kappa 2} \quad (10)$$

In Equation (10), $\kappa_1$ and $\kappa_2$ are predetermined parameters for adjusting influence of the first factor and the second factor, respectively. That is, Equation (10) shows that the probability p($C_{kt}$=[x]) of the type c of sound source is corrected by multiplying a $\kappa_1$ power of the first factor $q_1$($C_{-kt}$=c|$C_{kt}$=c;[d]) by a $\kappa_2$ power of the second factor $q_2$($C_{kt}$=c;[d]). Through the correction, the correction probability p'($C_{kt}$=c|[x]) becomes higher than the uncorrected probability p'($C_{kt}$=c|[x]). For the type c of sound source in which one or both of the first factor and the second factor cannot be calculated, the sound source estimation unit 143 obtains the correction probability p'($C_{kt}$=[x]) without performing the correction related to the factor that cannot be calculated.

The sound source estimation unit 143 determines the type $c_{kt}$* of each sound source indicated by the sound source direction information as a type of sound source having a highest correction probability, as shown in Equation (11).

[Equation 11]

$$c_{k_t}^{*}=\arg\max\ p(C_{k_t}=c|[x_{k_t}])\cdot q_1(C_{-k_t}=c|C_{k_t}=c;[d])^{\kappa 1}\cdot q_2(C_{k_t}=c;[d])^{\kappa 2} \quad (11)$$

The sound source estimation unit 143 generates sound source type information indicating the type of sound source determined for each sound source, and outputs the generated sound source type information to the output unit 15.

(The Sound Source Identification Process)

Next, a sound source identification process according to this embodiment will be described.

Figure 5:
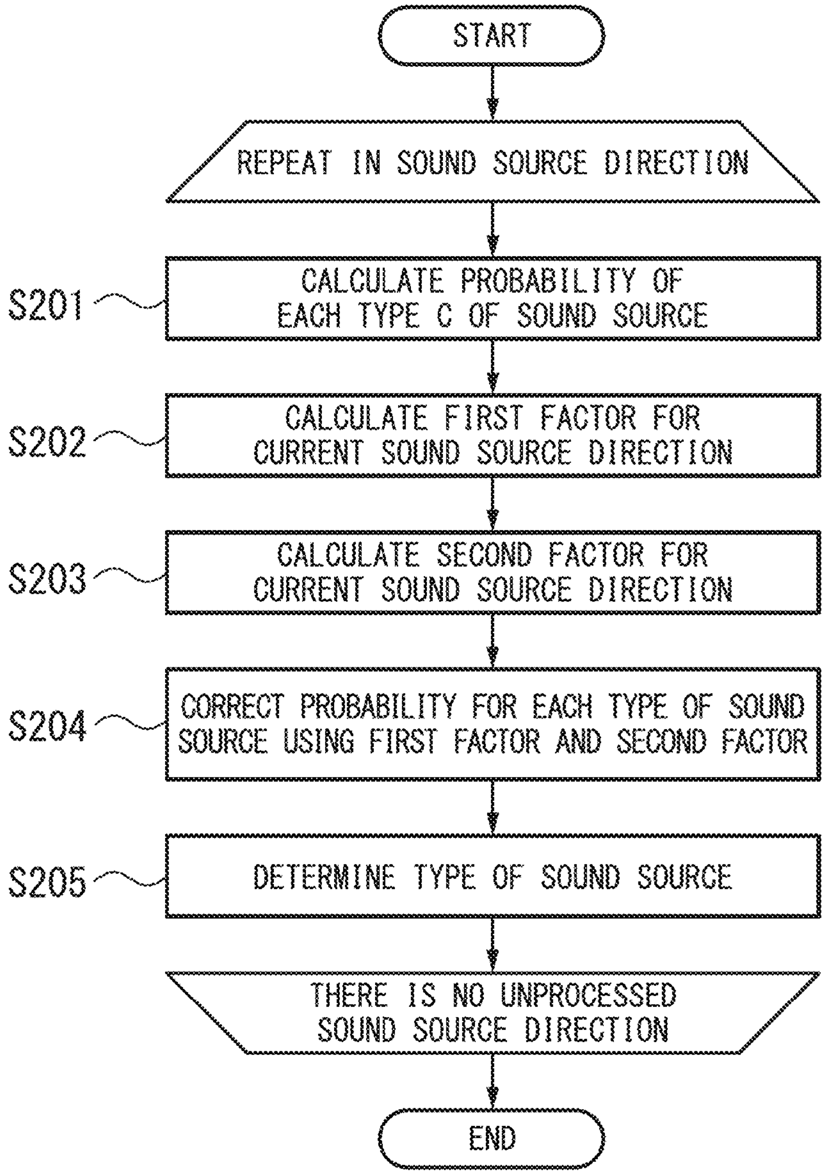
FIG. 5 is a flowchart illustrating a sound source identification process according to the first embodiment.

FIG. 5 is a flowchart illustrating a sound source identification process according to this embodiment.

The sound source estimation unit 143 repeatedly performs a process shown in steps S201 to S205 for each sound source direction. The sound source direction is designated by the sound source direction information input from the sound source localization unit 12.

(Step S201) The sound source estimation unit 143 calculates a probability p($C_{kt}$=c|[x]) of each type c of sound source by referring to the sound unit data stored in the model data storage unit 141, for the acoustic feature amount input from the acoustic feature amount calculation unit 142. Thereafter, the process proceeds to step S202.

(Step S202) The sound source estimation unit 143 calculates a first factor ($C_{-kt}$=c|$C_{kt}$=c;[d]) by referring to the first factor data stored in the model data storage unit 141 for a sound source direction at that point in time and another sound source direction. Thereafter, the process proceeds to step S203.

(Step S203) The sound source estimation unit 143 calculates the second factor $q_2$($C_{kt}$=c;[d]) by referring to the second factor data stored in the model data storage unit 141 for each sound source direction at that point in time. Thereafter, the process proceeds to step S204.

(Step S204) The sound source estimation unit 143 calculates the correction probability p'($C_{kt}$=c[x]) using the first factor $q_1$($C_{-kt}$=c|$C_{kt}$=c;[d]) and the second factor $q_2$($C_{kt}$=c;[d]), for example, using Equation (10) from the calculated probability p($C_{kt}$=c|[x]). Thereafter, the process proceeds to step S205.

(Step S205) The sound source estimation unit 143 determines the type of sound source according to the sound source direction at that point in time as a type of sound source of which the calculated correction probability is highest. Thereafter, the sound source estimation unit 143 ends the process in steps S201 to S205 when there is no unprocessed sound source direction.

(Audio Processing)

Next, audio processing according to this embodiment will be described.

Figure 6:
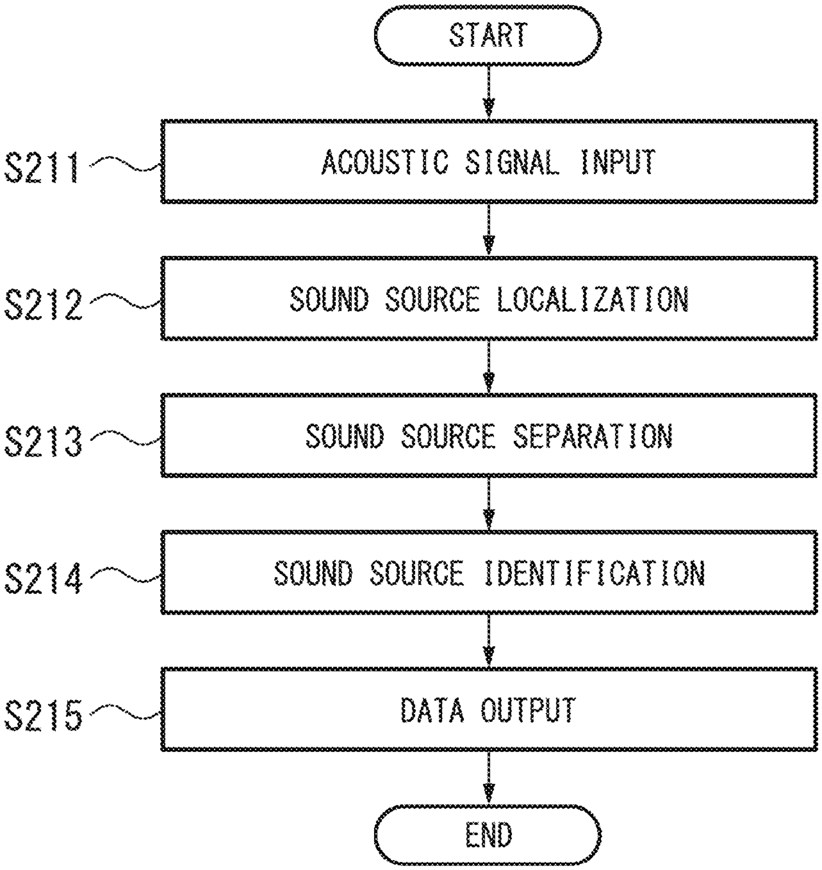
FIG. 6 is a flowchart illustrating audio processing according to the first embodiment.

FIG. 6 is a flowchart illustrating audio processing according to this embodiment.

(Step S211) The acoustic signal input unit 11 outputs the acoustic signal of P channels from the sound collection unit 20 to the sound source localization unit 12. Thereafter, the process proceeds to step S212.

(Step S212) The sound source localization unit 12 calculates a spatial spectrum for the acoustic signal of P channels input from the acoustic signal input unit 11, and determines the sound source direction of each sound source on the basis of the calculated spatial spectrum (sound source localization). The sound source localization unit 12 outputs the sound source direction information indicating the determined sound source direction for each sound source and the acoustic signal of P channels to the sound source separation unit 13 and the sound source identification unit 14. Thereafter, the process proceeds to step S213.

(Step S213) The sound source separation unit 13 separates the acoustic signal of P channels input from the sound source localization unit 12 into sound-source-specific acoustic signals of the respective sound sources on the basis of the sound source direction indicated by the sound source direction information.

The sound source separation unit 13 outputs the separated sound-source-specific acoustic signals to the sound source identification unit 14. Thereafter, the process proceeds to step S214.

(Step S214) The sound source identification unit 14 performs a sound source identification process illustrated in FIG. 5 on the sound source direction information input from the sound source localization unit 12 and the sound-source-specific acoustic signals input from the sound source separation unit 13. The sound source identification unit 14 outputs the sound source type information indicating the type of sound source for each sound source determined through the sound source identification process to the output unit 15. Thereafter, the process proceeds to step S215.

(Step S215) Data of the sound source type information input from the sound source identification unit 14 is output to the output unit 15. Thereafter, the process illustrated in FIG. 6 ends.

Modification Example

The case in which the sound source estimation unit 143 calculates the first factor using Equations (8) and (9) has been described by way of example, but the present invention is not limited thereto. The sound source estimation unit 143 may calculate a first factor that increases as an absolute value of a difference between a direction of one sound source and a direction of another sound source decreases.

Further, the case in which the sound source estimation unit 143 calculates the probability of each type of sound source using the first factor has been described by way of example, but the present invention is not limited thereto. When a direction of the other sound source of which the type of sound source is the same as that of the one sound source is within a predetermined range from a direction of the one sound source, the sound source estimation unit 143 may determine that the other sound source is the same sound source as the one sound source. In this case, the sound source estimation unit 143 may omit the calculation of the probability corrected for the other sound source. The sound source estimation unit 143 may correct the probability according to the type of sound source related to the one sound source by adding the probability according to the type of sound source related to the other sound source as the first factor.

As described above, the acoustic processing apparatus 10 according to this embodiment includes the sound source localization unit 12 that estimates the direction of the sound source from the acoustic signal of a plurality of channels, and the sound source separation unit 13 that performs separation into the sound-source-specific acoustic signal representing a component of the sound source of which the direction is estimated from the acoustic signal of a plurality of channels. Further, the acoustic processing apparatus 10 includes the sound source identification unit 14 that determines the type of sound source on the basis of the direction of the sound source estimated by the sound source localization unit 12 using the model data representing the relationship between the direction of the sound source and the type of sound source, for the separated sound-source-specific acoustic signal.

With this configuration, for the separated sound-source-specific acoustic signal, the type of sound source is determined based on the direction of the sound source. Therefore, performance of the sound source identification is improved.

Further, when the direction of the other sound source of which the type of sound source is the same as that of the one sound source is within a predetermined range from the direction of the one sound source, the sound source identification unit 14 determines that the other sound source is the same as the one sound source.

With this configuration, another sound source of which the direction is close to one sound source is determined as the same sound source as the one sound source. Therefore, even when one original sound source is detected as a plurality of sound sources of which the directions are close to one another through the sound source localization, processes related to the respective sound sources are avoided and the type of sound source is determined as one sound source. Therefore, performance of the sound source identification is improved.

Further, the sound source identification unit 14 determines a type of one sound source on the basis of the index value calculated by correcting the probability of each type of sound source, which is calculated using the model data, using the first factor indicating a degree where the one sound source is likely to be the same as the other sound source, and having a value increasing as a difference between a direction of the one sound source and a direction of the other sound source of which the type of sound source is the same as that of the one sound source decreases.

With this configuration, for another sound source of which the direction is close to that of one sound source and the type of sound source is the same as that of the one sound source, a determination of the type of the other sound source is prompted. Therefore, even when one original sound source is detected as a plurality of sound sources of which the directions are close to one another through the sound source localization, the type of sound source is correctly determined as one sound source.

Further, the sound source identification unit 14 determines a type of sound source on the basis of the index value calculated through correction using the second factor that is a presence probability according to the direction of the sound source estimated by the sound source localization unit 12.

With this configuration, the type of sound source is correctly determined in consideration of a possibility that the sound source is present for each type of sound source according to the direction of the sound source to be estimated.

Further, the sound source identification unit 14 determines that the number of sound sources for each type of sound source to be detected is at most 1 with respect to the sound source of which the direction is estimated by the sound source localization unit 12.

With this configuration, the type of sound source is correctly determined in consideration of the fact that types of sound sources located in different directions are different.

Second Embodiment

Next, a second embodiment of the present invention will be described. The same configurations as those in the above-described embodiment are denoted with the same reference numerals and description thereof is incorporated.

In the acoustic processing system 1 according to this embodiment, the sound source identification unit 14 of the acoustic processing apparatus 10 has a configuration that will be described below.

Figure 7:
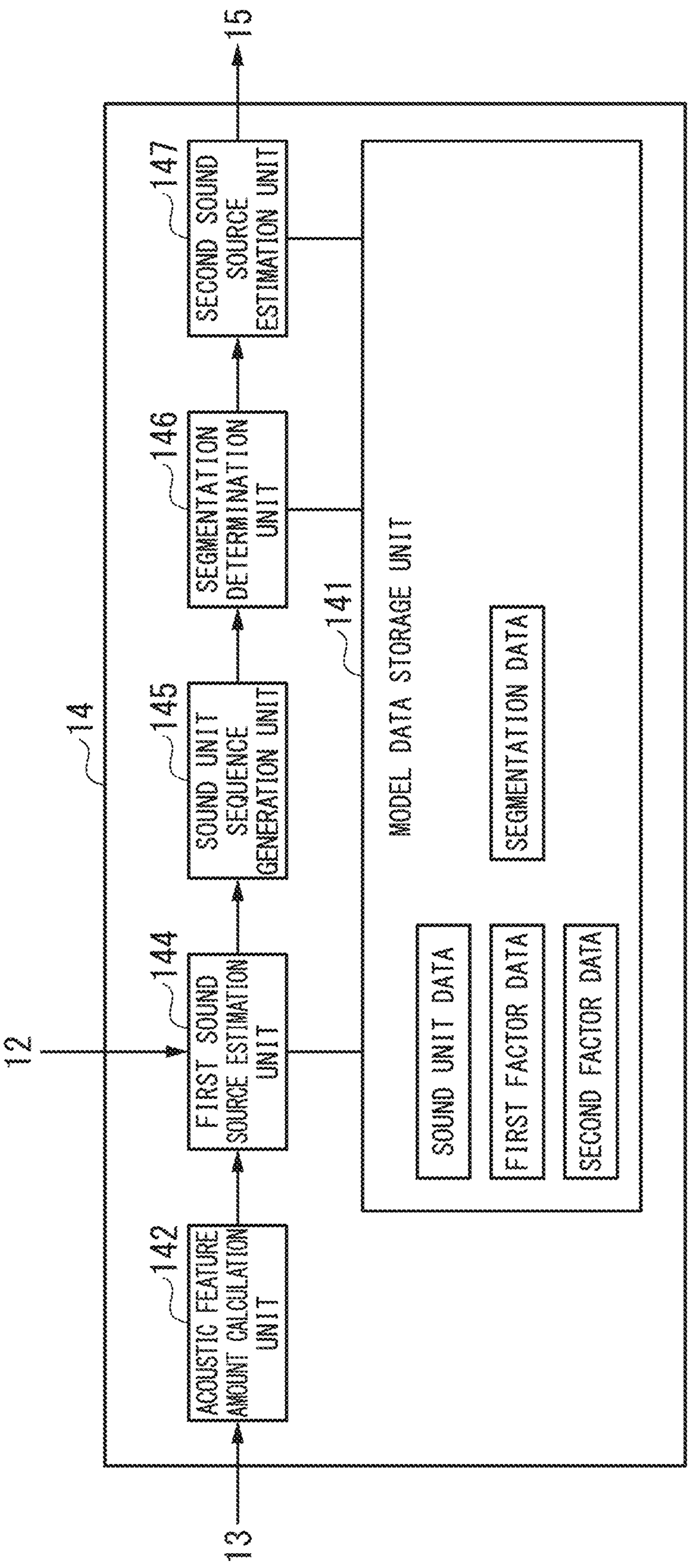
FIG. 7 is a block diagram illustrating a configuration of a sound source identification unit according to a second embodiment.

FIG. 7 is a block diagram illustrating a configuration of the sound source identification unit 14 according to this embodiment.

The sound source identification unit 14 includes a model data storage unit 141, an acoustic feature amount calculation unit 142, a first sound source estimation unit 144, a sound unit sequence generation unit 145, a segmentation determination unit 146, and a second sound source estimation unit 147.

The model data storage unit 141 stores, as model data, segmentation data for each type of sound source, in addition to sound unit data, first factor data and second factor data. The segmentation data is data for determining segmentation of a sound unit sequence including one or a plurality of sound unit sequences. The segmentation data will be described below.

The first sound source estimation unit 144 determines a type of sound source for each sound source, similar to the sound source estimation unit 143. The first sound source estimation unit 144 may also perform maximum a posteriori estimation (MAP estimation) on an acoustic feature amount [x] of each sound source to determine a sound unit s* (Equation (12)).

[Equation 12]

$$s^* = \underset{s_{cj}}{\mathrm{argmax}}\, p(s_{cj} \mid [x]) \qquad (12)$$

More specifically, the first sound source estimation unit 144 calculates a probability $p(s_{cj}|[x])$ for each sound unit $s_{cj}$ according to the determined type of sound source by referring to the sound unit data stored in the model data storage unit 141 for the acoustic feature amount [x]. The first sound source estimation unit 144 determines the sound unit in which the calculated probability $p(s_{cj}|[x])$ is highest as a sound unit $s_{kt}$* according to the acoustic feature amount [x]. The first sound source estimation unit 144 outputs frame-specific sound unit information indicating the sound unit and the sound source direction determined for each sound source for each frame to the sound unit sequence generation unit 145.

The sound unit sequence generation unit 145 receives the frame-specific sound unit information from the first sound source estimation unit 144. The sound unit sequence generation unit 145 determines that a sound source of which the sound source direction in a current frame is within a predetermined range from a sound source direction in a past frame is the same, and places the sound unit in the current frame of the sound source determined to be the same after the sound unit in the past frame. Here, the previous frame refers to a predetermined number of frames (for example, 1 to 3 frames) before the current frame. The sound unit sequence generation unit 145 generates a sound unit sequence $[s_k]$ ($=[s^1, s^2, s^3, \ldots, s^t, \ldots, s^L]$) of each sound source k by sequentially repeatedly performing a subsequent process on each frame for each sound source. L indicates the number of sound units included in one generation of a sound of each sound source. The generation of the sound refers to an event from the start to the stop of the generation. For example, in a case in which the sound unit sequences is not detected for a predetermined time (for example, 1 to 2 seconds) or more from the generation of previous sound, the first sound source estimation unit 144 determines that the generation of the sound stops. Thereafter, the sound unit sequence generation unit 145 determines that a sound is newly generated when a sound source of which the sound source direction in a current frame is outside a predetermined range from a sound source direction in the past frame is detected. The sound unit sequence generation unit 145 outputs sound unit sequence information indicating the sound unit sequence of each sound source k to the segmentation determination unit 146.

The segmentation determination unit 146 determines a sound unit group sequence including a segmentation of a sound unit sequence $[s_k]$ input from the sound unit sequence generation unit 145, that is, a sound unit group $w_s$ (s is an integer indicating an order of the sound unit group) by referring to the segmentation data for each type c of sound source stored in the model data storage unit 141. That is, the sound unit group sequence is a data sequence in which the sound unit sequence including sound units is segmented for each sound unit group $w_s$. The segmentation determination unit 146 calculates an appearance probability for each candidate of a plurality of sound unit group sequence, that is, a recognition likelihood, using the segmentation data stored in the model data storage unit 141.

When calculating the appearance probability of each candidate of the sound unit group sequence, the segmentation determination unit 146 sequentially multiplies the appearance probability indicated by the N-gram of each sound unit group included in the candidate. The appearance probability of the N-gram of the sound unit group is a probability of the sound unit group appearing when the sound unit group sequence immediately before the sound unit group is given. This appearance probability is given by referring to the sound unit group N-gram model described above. The appearance probability of the individual sound unit group can be calculated by sequentially multiplying the appearance probability of a leading sound unit in the sound unit group by the appearance probability of the N-gram of the subsequent sound unit. The appearance probability of the N-gram of the sound unit is a probability of the sound unit appearing when the sound unit sequence immediately before the sound unit is given. The appearance probability (unigram) of the leading sound unit and the appearance probability of the N-gram of the sound unit are given by referring to the sound unit N-gram model. The segmentation determination unit 146 selects the sound unit group sequence in which the appearance probability for each type c of sound source is highest, and outputs appearance probability information indicating the appearance probability of the selected sound unit group sequence to the second sound source estimation unit 147.

The second sound source estimation unit 147 determines the type c* of sound source having the highest appearance probability among the appearance probabilities of the respective types c of sound sources indicated by the appearance probability information input from the segmentation determination unit 146 as shown in Equation (13), as a type of sound source of the sound source k. The second sound source estimation unit 147 outputs sound source type information indicating the determined type of sound source to the output unit 15.

[Equation 13]

$$c^* = \underset{c}{\mathrm{argmax}}\, p([s_k]; c) \qquad (13)$$

(Segmentation Data)

Next, segmentation data will be described. The segmentation data is data used to segment a sound unit sequence in which a plurality of sound units are concatenated, into a plurality of sound unit groups. The segmentation is a boundary between one sound unit group and a subsequent sound unit group. The sound unit group is a sound unit sequence in which one sound unit or a plurality of sound units are concatenated. The sound unit, the sound unit group, and the sound unit sequence are units equivalent to a phoneme or a character, a word, and a sentence in natural language, respectively.

The segmentation data is a statistical model including a sound unit N-gram model and a sound unit group N-gram model. This statistical model may be referred to as a sound unit and sound unit group N-gram model in the following description. The segmentation data, that is, the sound unit and sound unit group N-gram model, is equivalent to a character and word N-gram model, which is a type of language model in natural language processing.

The sound unit N-gram model is data indicating a probability (N-gram) for each sound unit that appears after one or a plurality of sound units in any sound unit sequence. In the sound unit N-gram model, the segmentation may be treated as one sound unit. In the following description, the sound unit N-gram model may also refer to a statistical model including a probability thereof.

The sound unit group N-gram model is data indicating a probability (N-gram) for each one sound unit group that appears after one or a plurality of sound unit groups in any sound unit group sequence. That is, an appearance probability of the sound unit group is a probabilistic model indicating an appearance probability of the next sound unit group when a sound unit group sequence including at least one sound unit group is given. In the following description, the sound unit group N-gram model may also refer to a statistical model including a probability thereof.

In the sound unit group N-gram model, the segmentation may be treated as a type of sound unit group constituting the sound unit group N-gram. The sound unit N-gram model and the sound unit group N-gram model are equivalent to a word model and a grammar model in natural language processing, respectively.

The segmentation data may be data configured as a statistical model conventionally used in voice recognition, such as Gaussian mixture model (GMM) or Hidden Markov Model (HMM).

In this embodiment, a set of one or a plurality of labels and a statistical amount defining a probabilistic model may be associated with a label indicating a sound unit that subsequently appears to constitute the sound unit N-gram model. A set of one or a plurality of sound unit groups and the statistical amount defining a probabilistic model may be associated with a sound unit group that subsequently appears to constitute the sound unit group N-gram model. The statistical amount defining a probabilistic model is a mixing weight coefficient, a mean, and a covariance matrix of each multivariate Gaussian distribution if the probabilistic model is the GMM, and is a mixing weight coefficient, a mean, a covariance matrix, and a transition probability of each multivariate Gaussian distribution if the probabilistic model is the HMM.

In the sound unit N-gram model, the statistical amount is determined by prior learning so that an appearance probability of a subsequently appearing sound unit is given to one or a plurality of input labels.

In the prior learning, conditions may be imposed so that an appearance probability of a label indicating another sound unit that subsequently appears becomes zero. In the sound unit group N-gram model, for one or a plurality of input sound unit groups, a statistical amount is determined by prior learning so that an appearance probability of each sound unit group that subsequently appears is given. In the prior learning, conditions may be imposed so that an appearance probability of another sound unit group that subsequently appears becomes zero.

Example of Segmentation Data

Next, an example of the segmentation data will be described. As described above, the segmentation data includes the sound unit N-gram model and the sound unit group N-gram model. "N-gram" is a generic term for a statistical model representing a probability of the next element appearing when a probability (unigram) of one element appearing and a sequence of N−1 (N is an integer greater than 1) elements (for example, sound units) are given. A unigram is also referred to as a monogram. In particular, when N=2 and 3, the N-grams are respectively referred to as a bigram and a trigram.

FIGS. 8A to 8C are diagrams illustrating examples of the sound unit N-gram model.

FIGS. 8A, 8B, and 8C illustrate examples of a sound unit unigram, a sound unit bigram, and a sound unit trigram, respectively.

FIG. 8A illustrates that a label indicating one sound unit and the sound unit unigram are associated with each other. In a second row of FIG. 8A, a sound unit "$s_1$" and a sound unit unigram "$p(s_1)$" are associated with each other. Here, $p(s_1)$ indicates an appearance probability of the sound unit "$s_1$." In a third row of FIG. 8B, the sound unit sequence "$s_2s_1$" and the sound unit bigram "$p(s_1|s_2)$" are associated with each other. Here, $p(s_1|s_2)$ indicates a probability of the sound unit $s_1$ appearing when the sound unit $s_2$ is given. In a second row of FIG. 8C, the sound unit sequence "sisisi" and the sound unit trigram "$p(s_1|s_1s_1)$" are associated with each other.

FIGS. 9A to 9C are diagrams illustrating examples of the sound unit group N-gram model.

FIGS. 9A, 9B, and 9C illustrate examples of the sound unit group unigram, the sound unit group bigram, and the sound unit group trigram, respectively.

FIG. 9A illustrates that a label indicating one sound unit group and a sound unit group unigram are associated with each other. In a second row of FIG. 9A, a sound unit group "$w_1$" and a sound unit group unigram "$p(w_1)$" are associated with each other. One sound unit group is formed of one or a plurality of sound units.

In a third row of FIG. 9B, a sound unit group sequence "$w_2w_1$" and a sound unit group bigram "$p(w_1|w_2)$" are associated with each other. In a second row of FIG. 9C, a sound unit group sequence "$w_1w_1w_1$" and a sound unit group trigram "$p(w_1|w_1w_1)$" are associated with each other. Although the label is attached to each sound unit group in the example illustrated in FIGS. 9A to 9C, a sound unit sequence forming each sound unit group may be used instead of the label. In this case, a segmentation sign (for example, |) indicating a segmentation between sound unit groups may be inserted.

(Model Data Generation Unit)

Next, a process performed by the model data generation unit 16 (FIG. 1) according to this embodiment will be described.

The model data generation unit 16 arranges sound units associated with the respective sections of the sound-source-specific acoustic signal in an order of time to generate a sound unit sequence. The model data generation unit 16 generates segmentation data for each type c of sound source from the generated sound unit sequence using a predetermined scheme, such as a Nested Pitman-Yor (NPY) process. The NPY process is a scheme that is conventionally used in natural language processing.

In this embodiment, a sound unit, a sound unit group, and a sound unit sequence are applied to the NPY process in place of characters, words, and sentences in natural language processing. That is, the NPY process is performed to generate a statistical model in a nested structure of the sound unit group N-gram and the sound unit N-gram for statistical nature of the sound unit sequence. The statistical model generated through the NPY process is referred to as an NPY model. The model data generation unit 16 uses a Hierarchical Pitman-Yor (HPY) process when generating the sound unit group N-gram and the sound unit N-gram. The HPY process is a probability process in which a Dirichlet process is hierarchically expanded.

When generating the sound unit group N-gram using the HPY process, the model data generation unit 16 calculates an occurrence probability p(w|[h]) of the next sound unit group w of the sound unit group sequence [h] on the basis of an occurrence probability p(w|[h']) of the next sound unit group w of the sound unit group sequence [h']. When calculating the occurrence probability (p(w|[h]), the model data generation unit 16 uses, for example, Equation (14). Here, the sound unit group sequence [h'] is a sound unit group sequence $w_{t-n-1}, \ldots, w_{t-1}$ including n−1 sound unit groups up to an immediately previous sound unit group. t indicates an index for identifying a current sound unit group. The sound unit group sequence [h] is a sound unit group sequence $w_{t-n}, \ldots, w_{t-1}$ including n sound unit groups in which an immediately previous sound unit group $w_{t-n}$ is added to the sound unit group sequence [h'].

[Equation 14]

$$p(w\mid[h]) = \frac{c(w\mid[h]) - \eta\,\tau_{kw}}{\theta + \gamma([h])} + \frac{\theta + \eta\,\tau_k}{\theta + \gamma([h])}p(w\mid[h']) \tag{14}$$

In Equation (14), c(w|[h]) indicates the number of times (N-gram count) the sound unit group w occurs when the sound unit group sequence [h] is given. c([h]) is a sum $\Sigma_w c(w|[h])$ between sound unit groups w of the number of times c(w|[h]). $\tau_{kw}$ indicates the number of times (N−1 gram count) the sound unit group w occurs when the sound unit group sequence [h'] is given. $\tau_k$ is a sum $\Sigma_w \tau_{kw}$ between sound unit groups w of $\tau_{kw}$. θ indicates a strength parameter. The strength parameter θ is a parameter for controlling a degree of approximation of a probability distribution including the occurrence probability p(w|[h]) to be calculated, to a base measure. The base measure is a prior probability of the sound unit group or the sound unit. η indicates a discount parameter. The discount parameter η is a parameter for controlling a degree of alleviation of an influence of the number of times the sound unit group w occurs when a given sound unit group sequence [h] is given. The model data generation unit 16 performs, for example, Gibbs sampling from predetermined candidate values to perform optimization when determining the parameters θ and η.

The model data generation unit 16 uses a certain order of occurrence probability p(w|[h]) as a base measure to calculate the appearance probability p(w|[h]) of an order one higher than such an order, as described above. However, if information relating to a boundary of the sound unit group, that is, the segmentation, is not given, the base measure cannot be obtained.

Therefore, the model data generation unit 16 generates a sound unit N-gram using the HPY process, and uses the generated sound unit N-gram as a base measure of the sound unit group N-gram. Accordingly, the NPY model and the updating of the segmentation are alternately performed and the segmentation data is optimized as a whole.

The model data generation unit 16 calculates an occurrence probability p(s|[s]) of the next sound unit s of the sound unit sequence [s] on the basis of an occurrence probability p(s|[s]) of the next sound unit s of the given sound unit sequence [s'] when generating the sound unit N-gram. The model data generation unit 16 uses, for example, Equation (15) when calculating the occurrence probability p(s|[s]). Here, the sound unit sequence [s'] is a sound unit sequence $s_{l-n-1}, \ldots, s_{l-1}$ including n−1 recent sound units. l indicates an index for identifying a current sound unit. The sound unit sequence [s] is a sound unit sequence $s_{l-n}, \ldots, s_{l-1}$ including n sound units obtained by adding an immediately previous sound unit sequence $s_{l-n}$ to the sound unit sequence [s'].

[Equation 15]

$$p(s\mid[s]) = \frac{\delta(s\mid[s]) - \sigma u_{[s]s}}{\xi + \delta([s])} + \frac{\xi + \sigma\,u_s}{\xi + \delta([s])}p(s\mid[s']) \tag{15}$$

In Equation (15), δ(s|[s]) indicates the number of times (N-gram count) the sound unit s occurs when the sound unit sequence [s] is given. δ([s]) is a sum $\Sigma_s\delta(s|[s])$ between sound units of the number of times δ(s|[s]). $u_{[s]s}$ indicates the number of times (N−1 gram count) the sound unit s occurs when the sound unit sequence [s] is given. $u_s$ is a sum $\Sigma_s\sigma_{[s]s}$ between the sound units s of $\sigma_{[s]s}$. ξ and σ are a strength parameter and a discount parameter, respectively. The model data generation unit 16 may perform Gibbs sampling to determine the strength parameter ξ and the discount parameter σ, as described above.

In the model data generation unit 16, an order of the sound unit N-gram and an order of the sound unit group N-gram may be set in advance. The order of the sound unit N-gram and the order of the sound unit group N-gram are, for example, a tenth order and a third order, respectively.

Figure 10:
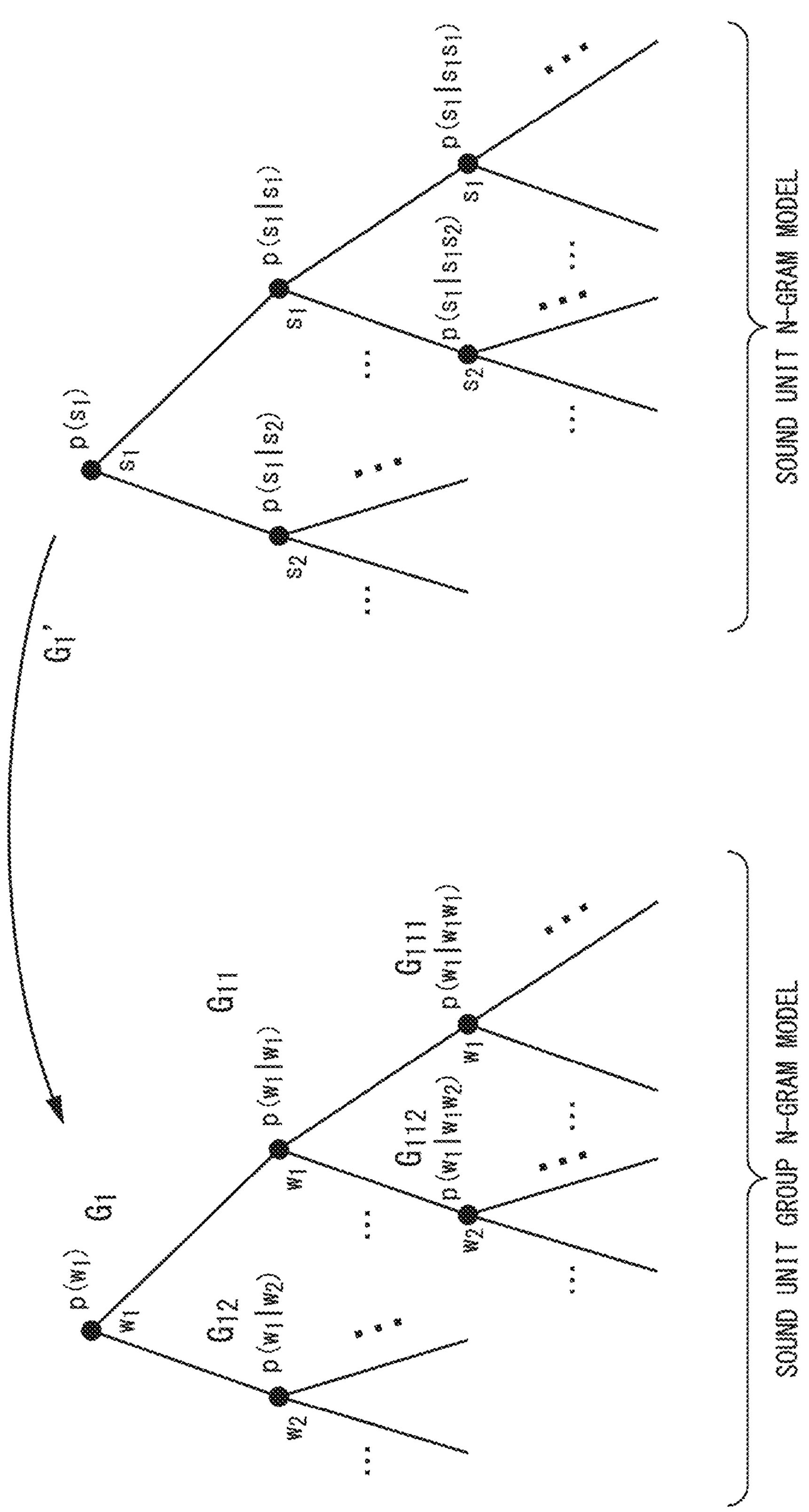
FIG. 10 is a diagram illustrating an example of an NPY model generated in an NPY process.

FIG. 10 is a diagram illustrating an example of the NPY model that is generated in an NPY process.

The NPY model illustrated in FIG. 10 is a sound unit group and sound unit N-gram model including a sound unit group N-gram and a sound unit N-gram model.

The model data generation unit 16 calculates bigrams $p(s_1|s_1)$ and $p(s_1|s_2)$, for example, on the basis of a unigram $p(s_1)$ indicating the appearance probability of the sound units $s_1$ when generating the sound unit N-gram model. The model data generation unit 16 calculates trigrams $p(s_1|s_1s_1)$ and $p(s_1|s_1s_2)$ on the basis of the bigram $p(s_1|s_1)$.

The model data generation unit 16 calculates the sound unit group unigram included in the sound unit group N-gram using the calculated sound unit N-gram, that is, the unigrams, the bigrams, the trigram, and the like as a base measure $G_1'$. For example, the unigram $p(s_1)$ is used to calculate a unigram $p(w_1)$ indicating the appearance probability of a sound unit group $w_1$ including a sound unit $s_1$. The model data generation unit 16 uses the unigram $p(s_1)$ and the bigram $p(s_1|s_2)$ to calculate a unigram $p(w_2)$ of a sound unit group $w_2$ including a sound unit sequence $s_1s_2$. The model data generation unit 16 uses the unigram $p(s_1)$, the bigram $p(s_1|s_1)$, and trigram $p(s_1|s_1s_2)$ to calculate a unigram $p(w_3)$ of a sound unit group $w_3$ including a sound unit sequence $s_1s_1s_2$.

The model data generation unit 16 calculates bigrams $p(w_1|w_1)$ and $p(w_1|w_2)$ using, for example, the unigram $p(w_1)$ indicating the appearance probability of the sound unit group $w_1$ as the base measure $G_1$ when generating the sound unit group N-gram model. Further, the model data generation unit 16 calculates trigrams $p(w_1|w_1w_1)$ and $p(w_1|w_1w_2)$ using the bigram $p(w_1|w_1)$ as the base measure $G_{11}$.

Thus, the model data generation unit 16 sequentially calculates the N-gram of a higher order sound unit group on the basis of the N-grams of a certain order of sound unit group on the basis of the selected sound unit group sequence. The model data generation unit 16 stores the generated segmentation data in the model data storage unit 141.

(Segmentation Data Generation Process)

Next, a segmentation data generation process according to this embodiment will be described.

The model data generation unit 16 performs the segmentation data generation process to be described next, in addition to the process illustrated in FIG. 3 as the model data generation process.

Figure 11:
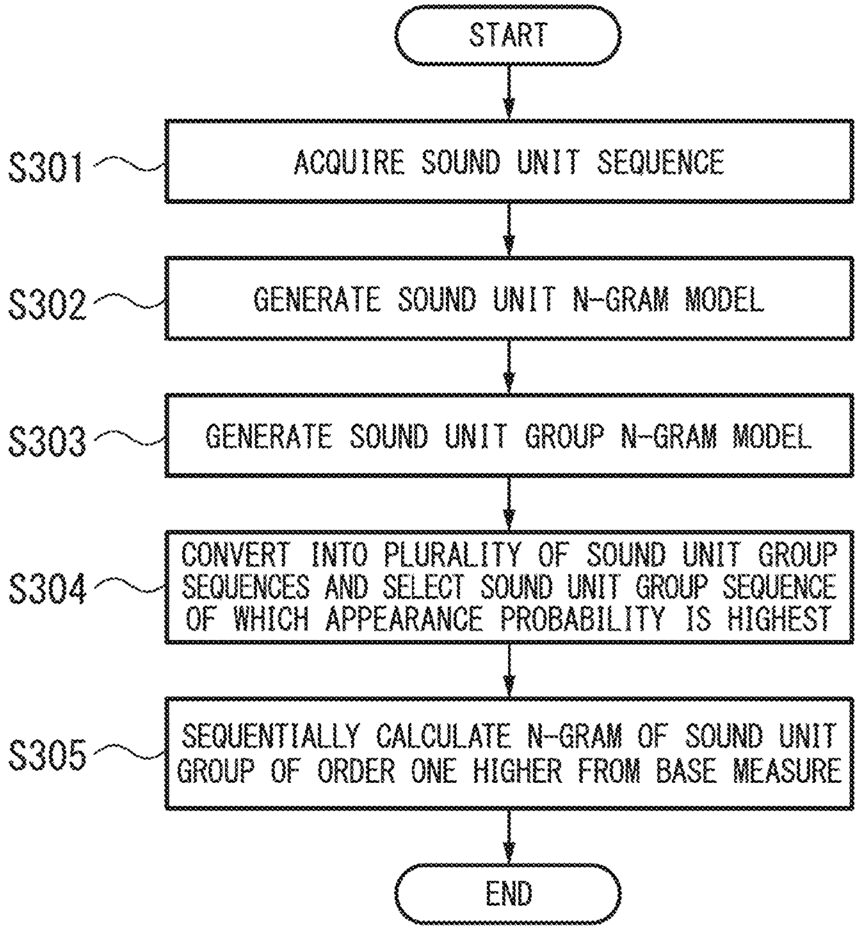
FIG. 11 is a flowchart illustrating a segmentation data generation process according to the second embodiment.

FIG. 11 is a flowchart illustrating the segmentation data generation process according to this embodiment.

(Step S301) The model data generation unit 16 acquires the sound units associated with the sound source acoustic signal in each section. The model data generation unit 16 arranges the acquired sound units associated in each section of the sound source acoustic signal in order of time to generate a sound unit sequence. Thereafter, the process proceeds to step S302.

(Step S302) The model data generation unit 16 generates a sound unit N-gram on the basis of the generated sound unit sequence. Thereafter, the process proceeds to step S303.

(Step S303) The model data generation unit 16 generates a unigram of the sound unit group using the generated sound unit N-gram as a base measure. Thereafter, the process proceeds to step S304.

(Step S304) The model data generation unit 16 generates a conversion table in which one or a plurality of sound units of each element of the generated sound unit N-gram, the sound unit group, and the unigram are associated with one another. Then, the model data generation unit 16 converts the generated sound unit sequence into a plurality of sound unit group sequences using the generated conversion table, and selects the sound unit group sequence of which the appearance probability is highest among the plurality of converted sound unit group sequences. Thereafter, the process proceeds to step S305.

(Step S305) The model data generation unit 16 uses the N-gram of a certain order of sound unit group as a base measure to sequentially calculate the N-gram of the sound unit group of an order one higher than such an order on the basis of the selected sound unit group sequence. Then, the process illustrated in FIG. 11 ends.

Evaluation Experiment

Next, an evaluation experiment performed by operating the acoustic processing apparatus 10 according to this embodiment will be described. In the evaluation experiment, an acoustic signal of 8 channels was recorded in a park of an urban area. The sound of birds singing was included as a sound source in the recorded sound. For the sound-source-specific audio signal of each sound source obtained by the acoustic processing apparatus 10, a reference obtained by manually adding a label indicating the type of sound source and the sound unit in each section (III: Reference) was acquired. Some sections of the reference were used to generate the model data. For the acoustic signal of the other portion, the type of sound source was determined for each section of the sound-source-specific acoustic signal by operating the acoustic processing apparatus 10 (II: This embodiment). For comparison, for the sound-source-specific audio signal obtained through the sound source separation as a conventional method, the type of sound source was determined for each section using the sound unit data for the sound-source-specific acoustic signal obtained by the sound source separation using GHDSS independently of the sound source localization using the MISIC method (I: Separation and identification). Further, the parameters $\kappa_1$ and $\kappa_2$ were 0.5.

Figure 12:
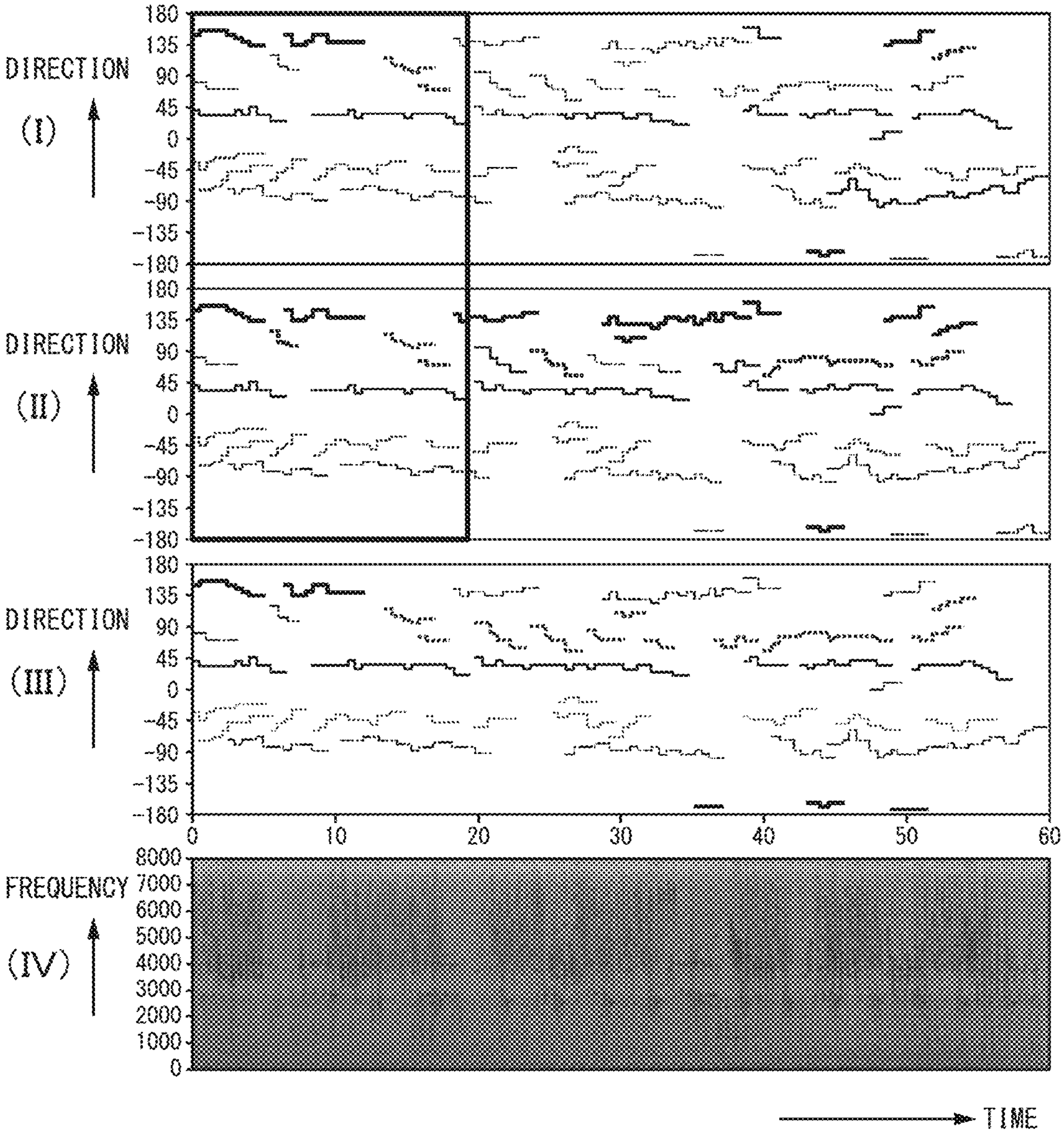
FIG. 12 is a diagram illustrating an example of a type of sound source to be determined for each section.

FIG. 12 is a diagram illustrating an example of a type of sound source determined for each section. FIG. 12 illustrates (I) a type of sound source obtained for separation and identification, (II) a type of sound source obtained for this embodiment, (III) a type of sound source obtained for reference, and (IV) a spectrogram of one channel in a recorded acoustic signal in order from the top. In (I) to (III), a vertical axis indicates the direction of the sound source, and in (IV), a vertical axis indicates frequency. In all of (I) to (IV), a horizontal axis indicates time. In (I) to (III), the type of sound source is indicated by a line style. A thick solid line, a thick broken line, a thin solid line, a thin broken line, and an alternate long and short dash line indicate a singing sound of a Narcissus flycatcher, a singing sound of a bulbul, a singing sound of a white-eye 1, a singing sound of a white-eye 2, and another sound source, respectively. In (IV), the magnitude of the power is represented by shade. Darker portion indicate higher power. For 20 seconds in a box surrounding leading portions of (I) and (II), a type of sound source of the reference is shown, and in a subsequent section, the estimated type of sound source is shown.

Figure 13:
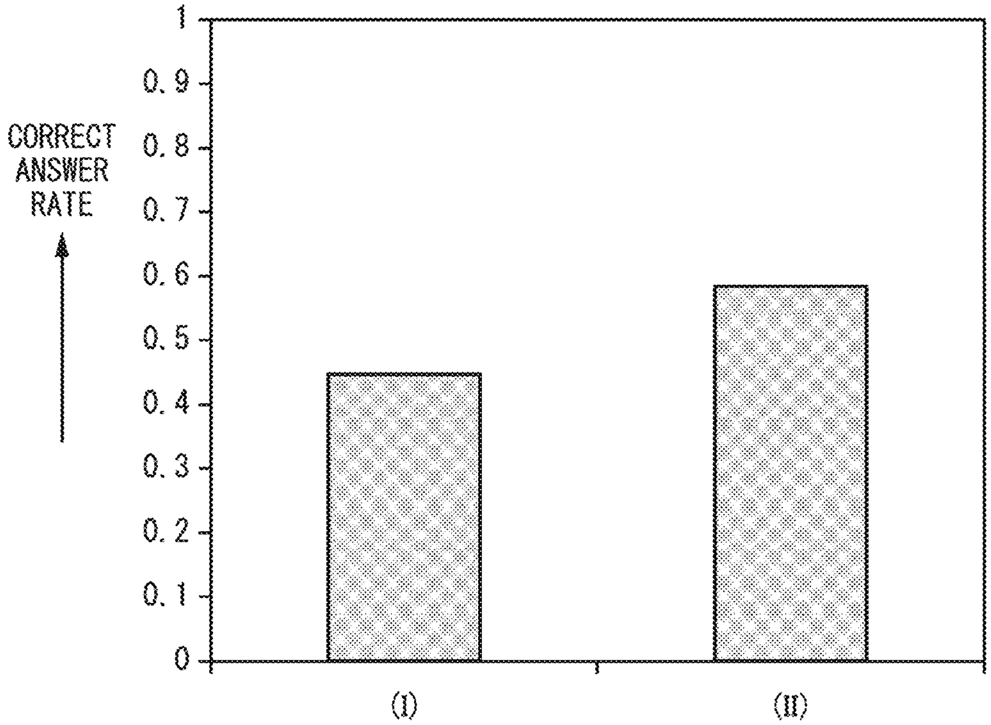
FIG. 13 is a diagram illustrating an example of a correct answer rate of sound source identification.

In comparison of (I) and (II), in this embodiment, the type of sound source of each sound source was correctly determined more often than in the separation and identification. According to (I), in the separation and identification, the type of sound source tends to be determined as white-eye 2 or the like 20 seconds later. On the other hand, according to (II), such a tendency is not observed, and a determination closer to the reference is made. This result is considered to be caused by a determination of different types of sound sources being promoted even in a case in which the sound from a plurality of sound sources is not completely separated through the sound source separation when the plurality of sound sources are simultaneously detected due to the first factor of this embodiment. According to (I) in FIG. 13, a correct answer rate is only 0.45 in the separation and identification, whereas according to (II), the correct answer rate is improved to 0.58 in this embodiment.

However, in comparison of (II) and (III) in FIG. 12, in this embodiment, the sound source of which the direction is about 135° tends to be originally recognized as "other sound source" and the type of sound source tends to be erroneously recognized as "Narcissus flycatcher." Further, for the sound source of which the direction is about −165°, "Narcissus flycatcher" tends to be erroneously determined as the "other sound source." Further, with respect to the "other sound source," acoustic characteristics of the sound source as a determination target are not specified. Accordingly, an influence of the distribution of directions of the sound sources according to the types of sound sources is considered to appear due to the second factor of this embodiment. Adjustment of various parameters or a more detailed determination of the type of sound source is considered to be able to further improve such a correct answer rate. The parameters as adjustment targets include, for example, $\kappa_1$ and $\kappa_2$ of Equations (10) and (11), and a threshold value of the probability for rejecting the determination of the type of sound source when the probability of each type of sound source is low.

Modification Example

For the sound unit sequences for each sound source k, the second sound source estimation unit 147 according to this embodiment may count the number of sound units according to the type of sound source for each type of sound source, and determine a type of sound source of which the counted number is largest as a type of sound source according to the sound unit sequence (majority). In this case, it is possible to omit the generation of the segmentation data in the segmentation determination unit 146 or the model data generation unit 16. Therefore, it is possible to reduce a processing amount when the type of sound source is determined.

As described above, in the acoustic processing apparatus according to this embodiment, the sound source identification unit 14 generates the sound unit sequence including a plurality of sound units that are constituent units of the sound according to the type of sound sources determined on the basis of the direction of the sound source, and determines the type of sound source according to the sound unit sequence on the basis of the frequency of each type of sound source according to the sound unit included in the generated sound unit sequence.

With this configuration, since the determinations of the type of sound source at respective times are integrated, the type of sound source is correctly determined for the sound unit sequence according to the generation of the sound.

Further, the sound source identification unit 14 calculates the probability of the sound unit group sequence in which the sound unit sequence determined on the basis of the direction of the sound source is segmented for each sound unit group by referring to the segmentation data for each type of sound that indicates the probability of segmenting the sound unit sequence including at least one sound unit into at least one sound unit group. Further, the sound source identification unit 14 determines the type of sound source on the basis of the probability calculated for each type of sound source.

With this configuration, the probability in consideration of acoustic characteristics, a temporal change in the acoustic feature, or a trend of repetition that are different according to the type of sound source is calculated. Therefore, performance of the sound source identification is improved.

In the embodiments and the modification examples described above, if the model data is stored in the model data storage unit 141, the model data generation unit 16 may be omitted. The process of generating the model data, which is performed by the model data generation unit 16, may be performed by an apparatus outside the acoustic processing apparatus 10, such as an electronic computer.

Further, the acoustic processing apparatus 10 may include the sound collection unit 20. In this case, the acoustic signal input unit 11 may be omitted. The acoustic processing apparatus 10 may include a storage unit that stores the sound source type information generated by the sound source identification unit 14. In this case, the output unit 15 may be omitted.

Some components of the acoustic processing apparatus 10 in the embodiments and modification examples described above, such as the sound source localization unit 12, the sound source separation unit 13, the sound source identification unit 14, and the model data generation unit 16, may be realized by a computer. In this case, the components can be realized by recording a program for realizing a control function thereof on a computer-readable recording medium, loading the program recorded on the recording medium to a computer system, and executing the program. Further, the "computer system" stated herein is a computer system built in the acoustic processing apparatus 10 and includes an OS or hardware such as a peripheral device. Further, the "computer-readable recording medium" refers to a flexible disk, a magneto-optical disc, a ROM, a portable medium such as a CD-ROM, or a storage device such as a hard disk built in a computer system. Further, the "computer-readable recording medium" may also include a recording medium that dynamically holds a program for a short period of time, such as a communication line when the program is transmitted over a network such as the Internet or a communication line such as a telephone line or a recording medium that holds a program for a certain period of time, such as a volatile memory inside a computer system including a server and a client in such a case. Further, the program may be a program for realizing some of the above-described functions or may be a program capable of realizing the above-described functions in combination with a program previously stored in the computer system.

Further, the acoustic processing apparatus 10 in the embodiments and the modification examples described above may be partially or entirely realized as an integrated circuit such as a large scale integration (LSI). Functional blocks of the acoustic processing apparatus 10 may be individually realized as a processor or may be partially or entirely integrated and realized as a processor. Further, a scheme of circuit integration is not limited to the LSI and may be realized by a dedicated circuit or a general-purpose processor. Further, if a circuit integration technology with which the LSI is replaced appears with the advance of semiconductor technology, an integrated circuit according to such a technology may be used.

Although embodiment of the present invention have been described above with reference to the drawings, a specific configuration is not limited to the above-described configuration, and various design modifications or the like can be made within the scope not departing from the gist of the present invention.

What is claimed is:

1. An acoustic processing apparatus, comprising:

a sound source localization unit, implemented via a processor, configured to estimate a direction of a sound source from an acoustic signal of a plurality of channels;

a sound source separation unit, implemented via the processor, configured to perform separation into a sound-source-specific acoustic signal representing a component of the sound source from the acoustic signal of the plurality of channels; and a sound source identification unit, implemented via the processor, configured to determine a type of sound source on the basis of the direction of the sound source estimated by the sound source localization unit using model data representing a relationship between the direction of the sound source and the type of sound source, for the sound-source-specific acoustic signal, wherein, when a direction of the other sound source of which the type of sound source is the same as that of one sound source is within a predetermined range from a direction of the one sound source, the sound source identification unit determines that the other sound source is the same as the one sound source, and wherein the sound source identification unit determines a type of sound source on the basis of an index value calculated through correction using a second factor that is a presence probability according to the direction of the sound source estimated by the sound source localization unit.

2. The acoustic processing apparatus according to claim 1, wherein the sound source identification unit determines a type of one sound source on the basis of an index value calculated by correcting a probability of each type of sound source, which is calculated using the model data, using a first factor indicating a degree where the one sound source is likely to be the same as the other sound source, and having a value increasing as a difference between a direction of the one sound source and a direction of the other sound source of which the type of sound source is the same as that of the one sound source decreases.

3. The acoustic processing apparatus according to claim 1, wherein the sound source identification unit determines that the number of sound sources for each type of sound source to be detected is at most 1 with respect to the sound source of which the direction is estimated by the sound source localization unit.

4. An acoustic processing method in an acoustic processing apparatus implemented via a processor, the acoustic processing method comprising:

a sound source localization step of estimating a direction of a sound source from an acoustic signal of a plurality of channels;

a sound source separation step of performing separation into a sound-source-specific acoustic signal representing a component of the sound source from the acoustic signal of the plurality of channels; and a sound source identification step of determining a type of sound source on the basis of the direction of the sound source estimated in the sound source localization step using model data representing a relationship between the direction of the sound source and the type of sound source, for the sound-source-specific acoustic signal, wherein the sound source identification step includes determining a type of one sound source on the basis of an index value calculated by correcting a probability of each type of sound source, which is calculated using the model data, using a first factor indicating a degree where the one sound source is likely to be the same as the other sound source, and having a value increasing as a difference between a direction of the one sound source and a direction of the other sound source of which the type of sound source is the same as that of the one sound source decreases.

5. An acoustic processing apparatus, comprising:

a sound source localization unit, implemented via a processor, configured to estimate a direction of a sound source from an acoustic signal of a plurality of channels;

a sound source separation unit, implemented via the processor, configured to perform separation into a sound-source-specific acoustic signal representing a component of the sound source from the acoustic signal of the plurality of channels; and a sound source identification unit, implemented via the processor, configured to determine a type of sound source on the basis of the direction of the sound source estimated by the sound source localization unit using model data representing a relationship between the direction of the sound source and the type of sound source, for the sound-source-specific acoustic signal, wherein the sound source identification unit determines a type of one sound source on the basis of an index value calculated by correcting a probability of each type of sound source, which is calculated using the model data, using a first factor indicating a degree where the one sound source is likely to be the same as the other sound source, and having a value increasing as a difference between a direction of the one sound source and a direction of the other sound source of which the type of sound source is the same as that of the one sound source decreases.

* * * * *